(12) United States Patent
Min et al.

(10) Patent No.: US 10,649,227 B2
(45) Date of Patent: May 12, 2020

(54) LENS MOVING APPARATUS

(71) Applicant: LG INNOTEK CO., LTD., Seoul (KR)

(72) Inventors: Sang Jun Min, Seoul (KR); Kyoung Ho Yoo, Seoul (KR); Hyune O Yoo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 64 days.

(21) Appl. No.: 16/122,568

(22) Filed: Sep. 5, 2018

(65) Prior Publication Data
US 2019/0004329 A1    Jan. 3, 2019

Related U.S. Application Data

(63) Continuation of application No. 14/886,819, filed on Oct. 19, 2015, now Pat. No. 10,095,047.

(30) Foreign Application Priority Data

Oct. 17, 2014    (KR) .................... 10-2014-0140849

(51) Int. Cl.
| | | |
|---|---|---|
| *G02B 27/64* | (2006.01) | |
| *H04N 5/225* | (2006.01) | |
| *G02B 7/08* | (2006.01) | |

(52) U.S. Cl.
CPC ............. *G02B 27/646* (2013.01); *G02B 7/08* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| | | |
|---|---|---|
| 7,228,069 B2 | 6/2007 | Sun |
| 2013/0050515 A1 | 2/2013 | Wu et al. |
| | (Continued) | |

FOREIGN PATENT DOCUMENTS

| | | |
|---|---|---|
| CN | 1225540 A | 8/1999 |
| CN | 1229928 A | 9/1999 |
| | (Continued) | |

OTHER PUBLICATIONS

Extended European Search Report dated Mar. 9, 2016 in European Application No. 15189311.2.

(Continued)

*Primary Examiner* — Darryl J Collins
*Assistant Examiner* — Journey F Sumlar
(74) *Attorney, Agent, or Firm* — Saliwanchik, Lloyd & Eisenschenk

(57) ABSTRACT

A lens moving apparatus includes a bobbin including a first coil, a first magnet facing the first coil, a housing supporting the first magnet, upper and lower elastic members coupled to the bobbin and the housing, a base spaced apart from the housing, a second coil unit, which faces the first magnet and includes a second coil, a circuit board on which the second coil unit is mounted, a plurality of support members, which support the housing such that the housing is movable in second and/or third directions and which connect at least one of the upper and lower elastic members to the circuit board, and a second sensor detecting displacement of the housing in the second and/or third directions, wherein the center of the second sensor is disposed so as not to overlap the second coil.

28 Claims, 24 Drawing Sheets

(56) References Cited

U.S. PATENT DOCUMENTS

| | | | |
|---|---|---|---|
| 2013/0050828 A1 | 2/2013 | Sato et al. | |
| 2013/0136438 A1 | 5/2013 | Lee et al. | |
| 2014/0177056 A1 | 6/2014 | Hayashi et al. | |
| 2015/0015729 A1 | 1/2015 | Kasamatsu | |

FOREIGN PATENT DOCUMENTS

| | | |
|---|---|---|
| CN | 1236261 A | 11/1999 |
| CN | 1256432 A | 6/2000 |
| CN | 202110321 U | 1/2012 |
| JP | 2008-170838 A | 7/2008 |
| JP | 2013-044924 A | 3/2013 |
| KR | 10-0918816 B1 | 9/2009 |
| KR | 10-1389375 B1 | 4/2014 |
| WO | WO-2013/183270 A1 | 12/2013 |

OTHER PUBLICATIONS

European Search Report dated Apr. 24, 2018 in European Application No. 18158927.6.
Office Action dated Dec. 26, 2018 in Chinese Application No. 201510680459.5, along with its English translation.

LENS MOVING APPARATUS

CROSS-REFERENCE TO RELATED APPLICATIONS

This application is a continuation of U.S. application Ser. No. 14/886,819, filed Oct. 19, 2015, which claims the benefit under 35 U.S.C. § 119 of Korean Application No. 10-2014-0140849, filed Oct. 17, 2014, which are hereby incorporated by reference in their entirety including any tables, figures, or drawings.

TECHNICAL FIELD

Embodiments relate to a lens moving apparatus, which is capable of accurately detecting the displacement of a moving unit by inhibiting unwanted interference with magnetic force.

BACKGROUND

It is difficult to adopt voice coil motor (VCM) technology, which is typically used in conventional camera modules, for use in an ultracompact camera module, which aims at achieving low power consumption, and thus research regarding the technology has been actively undertaken.

A camera module mounted in a small-sized electronic product, such as a smart phone, may be frequently subjected to shocks during use. In addition, the camera module may minutely shake due to the trembling of the user's hand while taking a photograph. Therefore, there is a high necessity for a technology capable of incorporating an optical image stabilizer into the camera module.

Various handshake correction technologies have been recently researched. Among such technologies, there is a technology of correcting handshake by moving an optical module in the x-axis and y-axis directions, which define a plane perpendicular to the optical axis. Since the technology moves and adjusts the optical system in the plane perpendicular to the optical axis for image correction, its structure is inevitably complicated, and thus it is not suitable for miniaturization.

Furthermore, there is the necessity for accurate sensing technology in handshake correction. A camera module is provided with various devices for generating magnetic force, and the sensing technologies employ the magnetic force. Since such a plurality of devices for generating magnetic force may apply the magnetic force to an unrelated sensing device, the sensing accuracy of the sensing device may be deteriorated.

BRIEF SUMMARY

Embodiments provide a lens moving apparatus, which is capable of accurately detecting the displacement of a moving unit by inhibiting unwanted interference with magnetic force.

In one embodiment, a lens moving apparatus includes a bobbin including a first coil disposed therearound and moving in a first direction, a first magnet disposed to face the first coil, a housing for supporting the first magnet, upper and lower elastic members coupled to the bobbin and the housing, a base disposed to be spaced apart from the housing by a predetermined distance, a second coil unit, which is disposed to face the first magnet and includes a second coil, a circuit board on which the second coil unit is mounted, a plurality of support members, which support the housing such that the housing is movable in second and/or third directions and which connect at least one of the upper and lower elastic members to the circuit board, and a second sensor for detecting displacement of the housing in the second and/or third directions, wherein the center of the second sensor is disposed so as not to overlap the second coil when viewed in the first direction.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
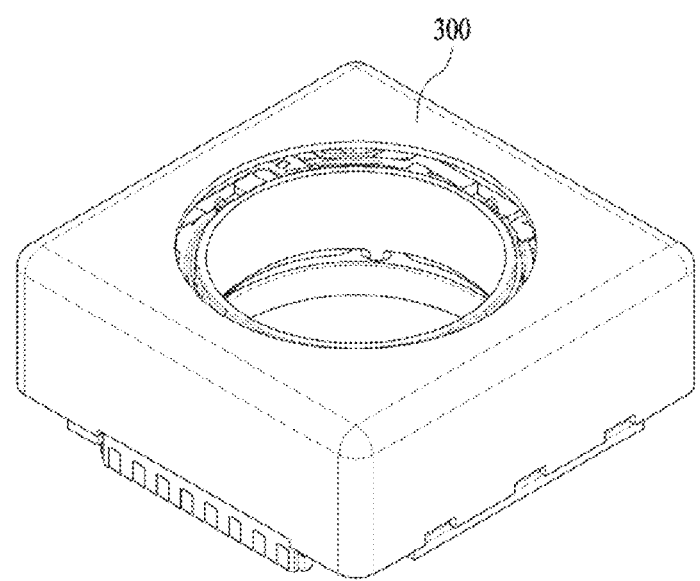
FIG. 1 is a schematic perspective view showing a lens moving apparatus according to an embodiment.
Figure 1:
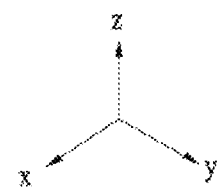

Hereinafter, embodiments will be described with reference to the attached drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

An optical image stabilizing apparatus, which is applied to compact camera modules of mobile devices such as smart phones or tablet PCs, refers to an apparatus configured to inhibit the contour of an image captured when taking a still image from not being clearly formed due to vibrations caused by the trembling of the user's hand.

In addition, an autofocusing apparatus is configured to automatically focus the subject image on the surface of an image sensor. The optical image stabilizing apparatus and the autofocusing apparatus may be configured in various manners. The lens moving apparatus according to the embodiments may perform the optical image stabilizing and/or autofocusing operations in such a manner as to move an optical module, composed of a plurality of lenses in a first direction or in a plane defined by the second and third directions, which are perpendicular to the first direction.

Figure 2:
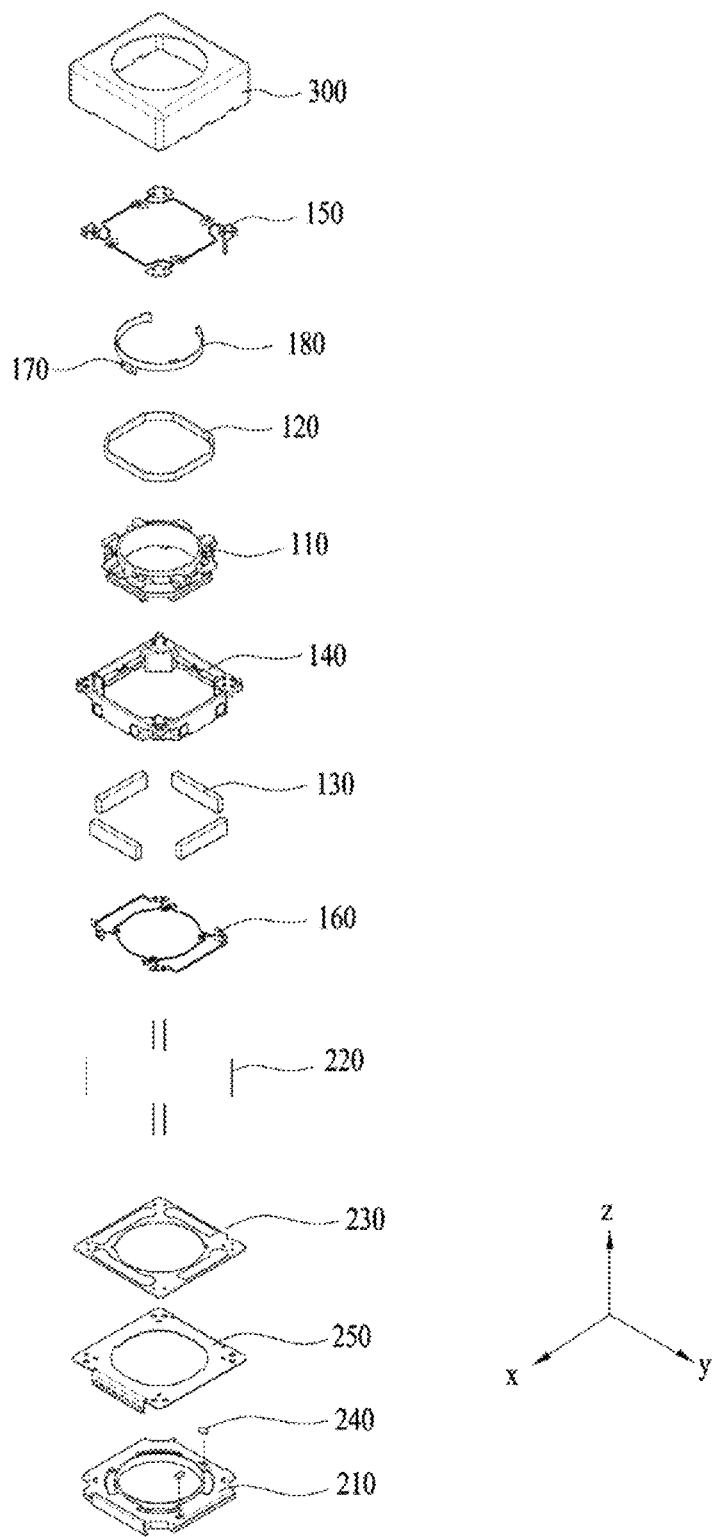
FIG. 2 is an exploded perspective view showing the lens moving apparatus according to the embodiment.

FIG. 1 is a schematic perspective view showing a lens moving apparatus according to an embodiment. FIG. 2 is an exploded perspective view of the lens moving apparatus shown in FIG. 1.

Referring to FIGS. 1 and 2, the lens moving apparatus according to the embodiment may include a first lens moving unit, a second lens moving unit, and a cover member 300.

The first lens moving unit may serve as the above-mentioned autofocusing apparatus. In other words, the first lens moving unit may serve to move a bobbin 110 in the first direction by virtue of the interaction between a magnet 130 and a first coil unit 120.

The second lens moving unit may serve as the handshake correction apparatus. In other words, the second lens moving unit may serve to move all or a portion of the first lens moving unit in the second and/or third directions by virtue of the interaction between the magnet 130 and the second coil unit 230.

The cover member 300 may be configured to have an approximate box shape so as to accommodate the first and second lens moving units therein.

Figure 3:
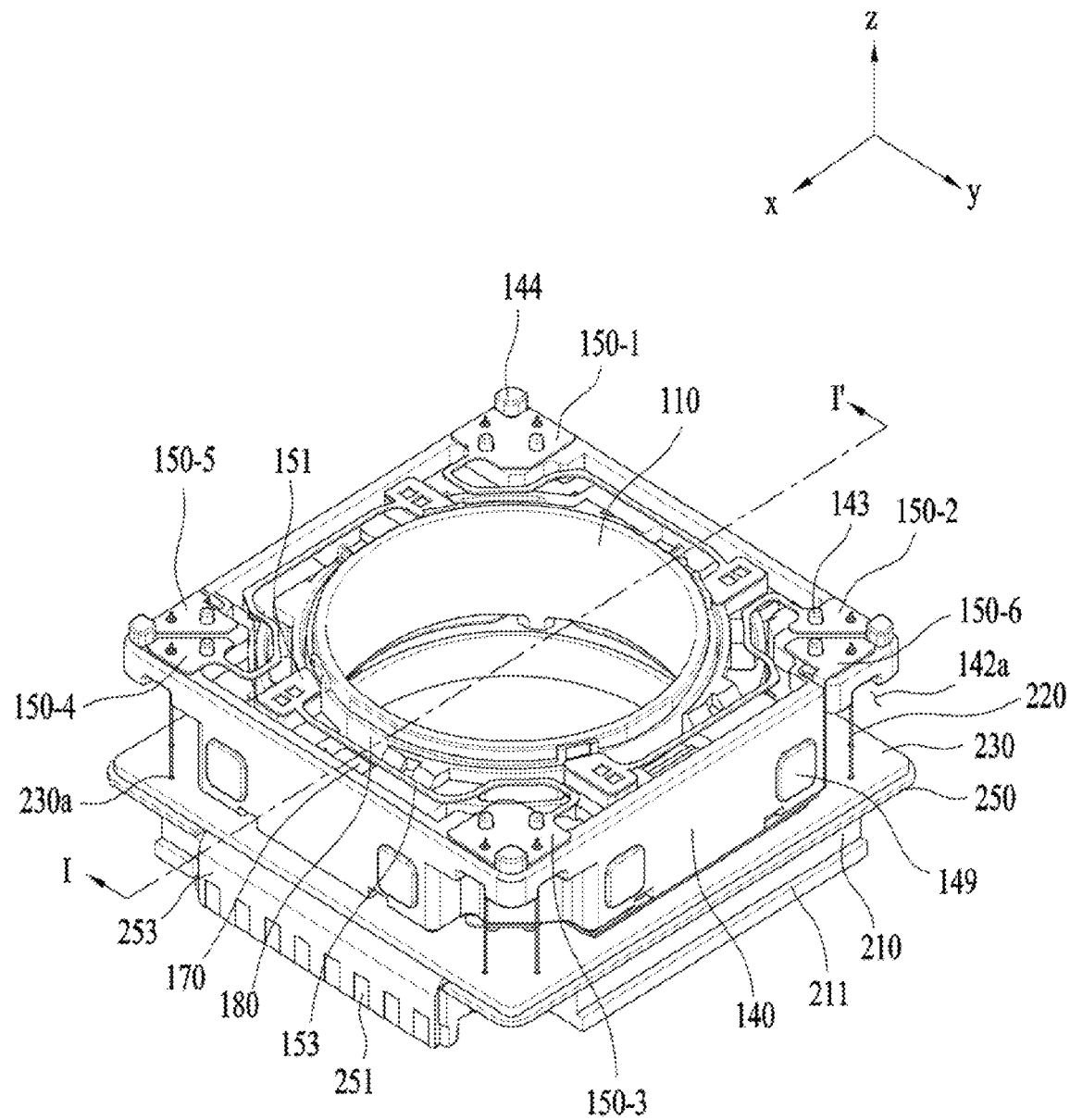
FIG. 3 is a perspective view showing a housing according to the embodiment.

FIG. 3 is a perspective view showing the lens moving apparatus according to the embodiment, from which the cover member 300 shown in FIG. 1 is removed.

The first lens moving unit may include the bobbin 110, the first coil unit 120, the magnet 130, a housing 140, an upper elastic member 150, a lower elastic member 160, a first sensor 170 and a sensor substrate 180.

Figure 4:
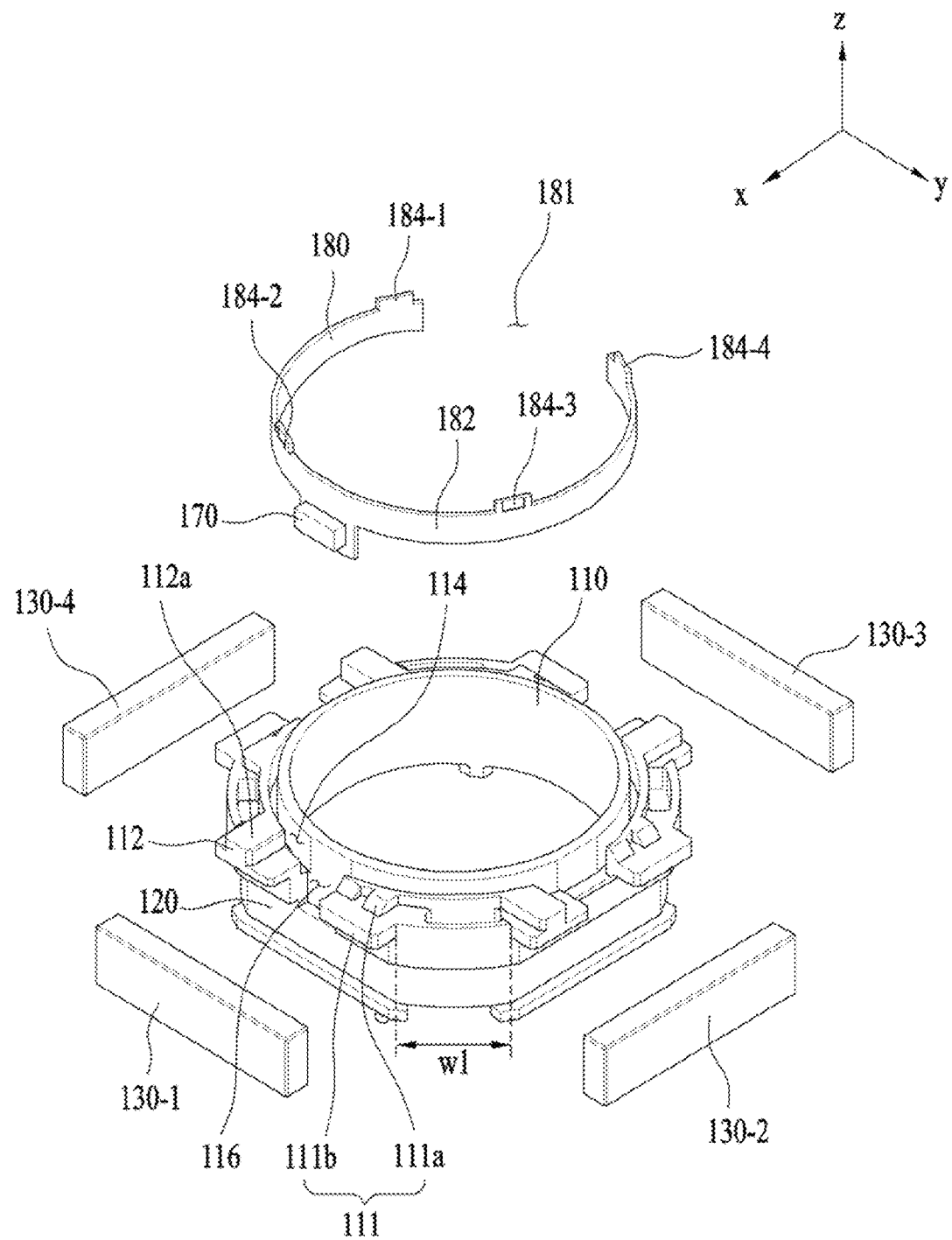
FIG. 4 is an exploded perspective view of the lens moving apparatus according to the embodiment, which shows the bobbin, the first coil unit, the magnet, the first sensor and the sensor substrate.
Figure 5A:
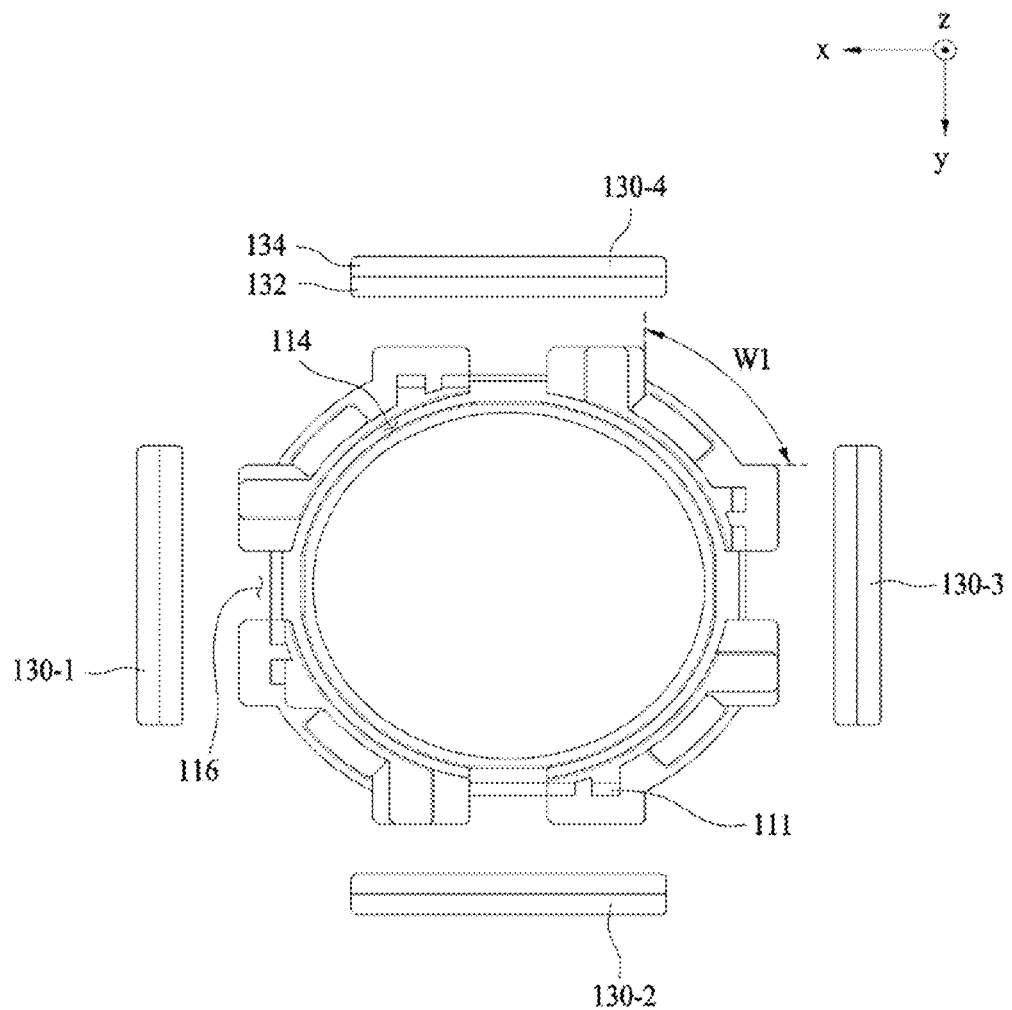
FIG. 5A is a plan view showing the bobbin and the magnet shown in FIG. 4.
Figure 5B:
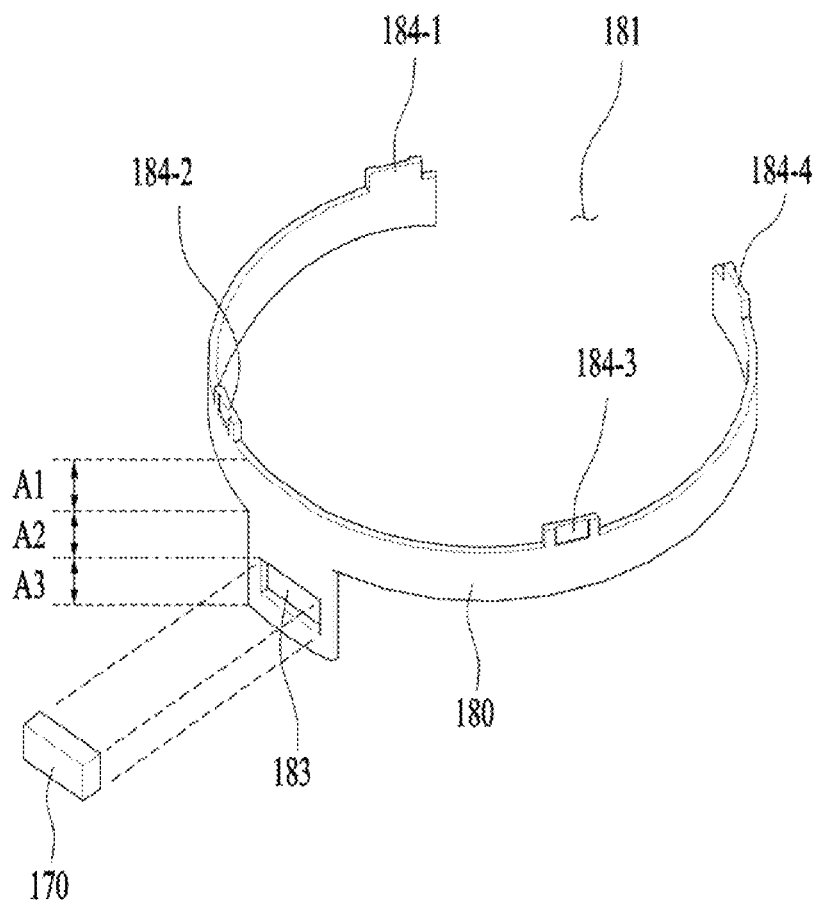
FIG. 5B is a perspective view showing another embodiment of the sensor substrate shown in FIG. 4.
Figure 5C:
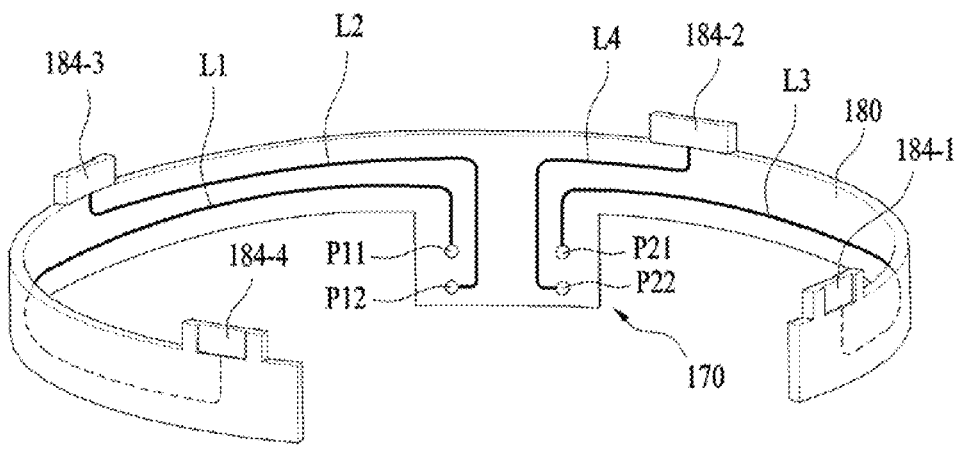
FIG. 5C is a rear perspective view showing one embodiment of the first sensor and the sensor substrate shown in FIG. 4.

FIG. 4 is an exploded perspective view of the lens moving apparatus according to the embodiment, which shows the bobbin 110, the first coil unit 120, the magnet 130 (130-1, 130-2, 130-3 and 130-4), the first sensor 170 and the sensor substrate 180. FIG. 5A is a plan view showing the bobbin 110 and the magnet 130 (130-1, 130-2, 130-3 and 130-4) shown in FIG. 4. FIG. 5B is a perspective view showing another embodiment of the sensor substrate 180 shown in FIG. 4. FIG. 5C is a rear perspective view showing one embodiment of the first sensor 170 and the sensor substrate 180 shown in FIG. 4.

Referring to the above-mentioned drawings, the bobbin 110 may be disposed in the internal space defined in the housing 140 so as to be reciprocated in the first direction. As shown in FIG. 4, the bobbin 110 may be provided therearound with the first coil unit 120 such that the first coil unit 120 and the magnet 130 interact with each other in an electromagnetic manner. To this end, the magnet 130 may be disposed around the bobbin 110 so as to face the first coil unit 120.

When the bobbin 110 performs the upward and/or downward movements in the first direction to fulfill the autofocusing function, the bobbin 110 may be elastically supported by means of the upper and lower elastic members 150 and 160. To this end, the upper and lower elastic members 150 and 160 may be coupled to the bobbin 110 and the housing 140, as will be described later.

Although not shown in the drawings, the lens moving apparatus may be include a lens barrel (not shown), which is provided on the inner side surface (i.e. the inner surface) of the bobbin 110 and on which at least one lens is mounted. The lens barrel may be mounted on the inner surface of the bobbin 110 in various ways. For example, the lens barrel may be directly secured to the interior of the bobbin 110, or a single lens may be integrally formed with the bobbin 110 without using the lens barrel. The lens mounted on the lens barrel may include a single lens, or may include two or more lenses, which constitute an optical system.

According to another embodiment, although not shown in the drawings, the bobbin 110 may be provided on the inner circumferential surface thereof with a female threaded portion and on the outer circumferential surface thereof with a male threaded portion corresponding to the female threaded portion such that the lens barrel is coupled to the bobbin 110 by virtue of threaded coupling between the female and male threaded portions. However, the embodiments are not limited thereto.

The bobbin 110 may include first and second protrusions 111 and 112.

The first protrusion 111 may include a guide portion 111a and a first stopper 111b. The guide portion 111a may serve to guide the installation position of the upper elastic member 150. For example, the guide portion 111a may guide the passage of a first frame connector 153 of the upper elastic member 150, as shown in FIG. 3. To this end, according to the embodiment, a plurality of guide portions 111a may protrude in the second and third directions, which are perpendicular to the first direction. The guide portions 111a may be provided in the plane defined by the x axis and the y axis so as to be symmetrical about the center point of the bobbin 110, as shown in the drawings, or may be provided so as to be asymmetrical about the center point of the bobbin 110 without interference with other components, unlike the embodiment shown in the drawings.

The second protrusion 112 may include a plurality of second protrusions, which protrude in the second and third directions perpendicular to the first direction. A first inner frame 151 of the upper elastic member 150, which will be described later, may be mounted on the upper surfaces 112a of the second protrusions 112.

Figure 6:
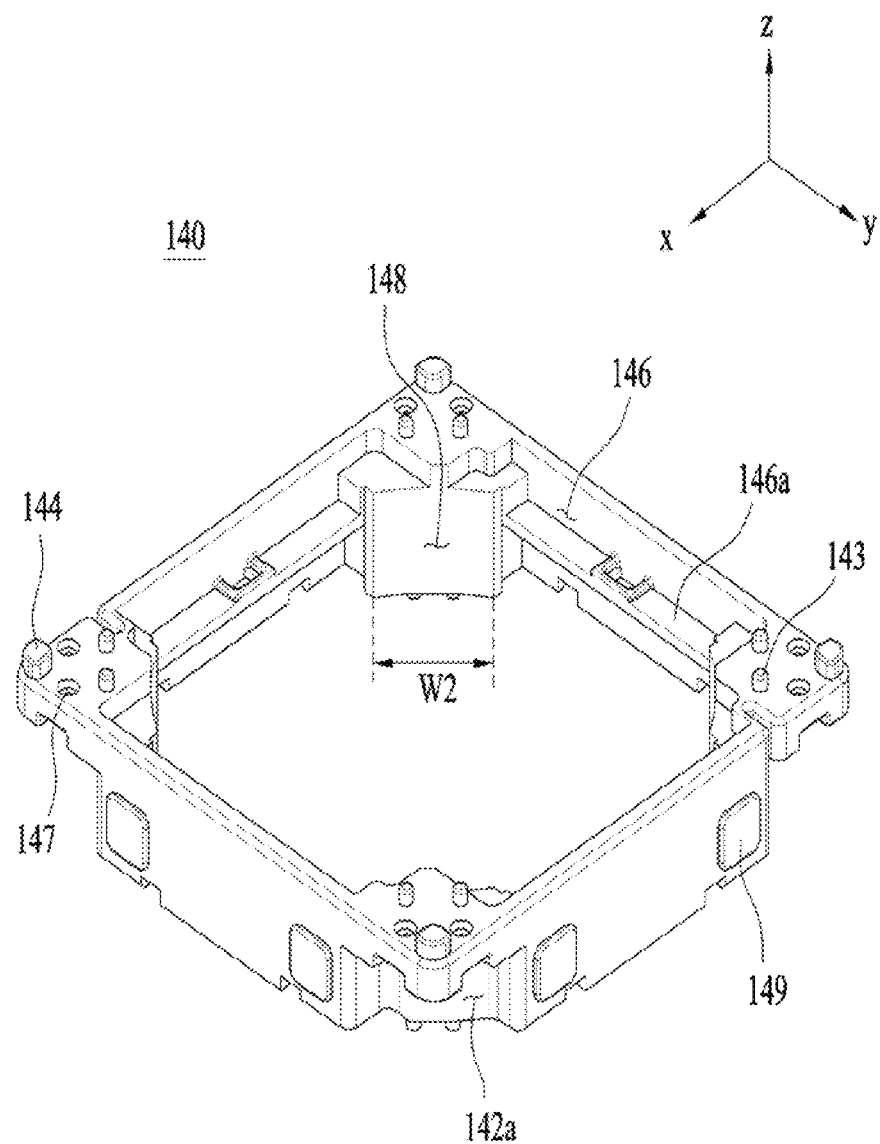
FIG. 6 is a top perspective view of the housing according to the embodiment.
Figure 7:
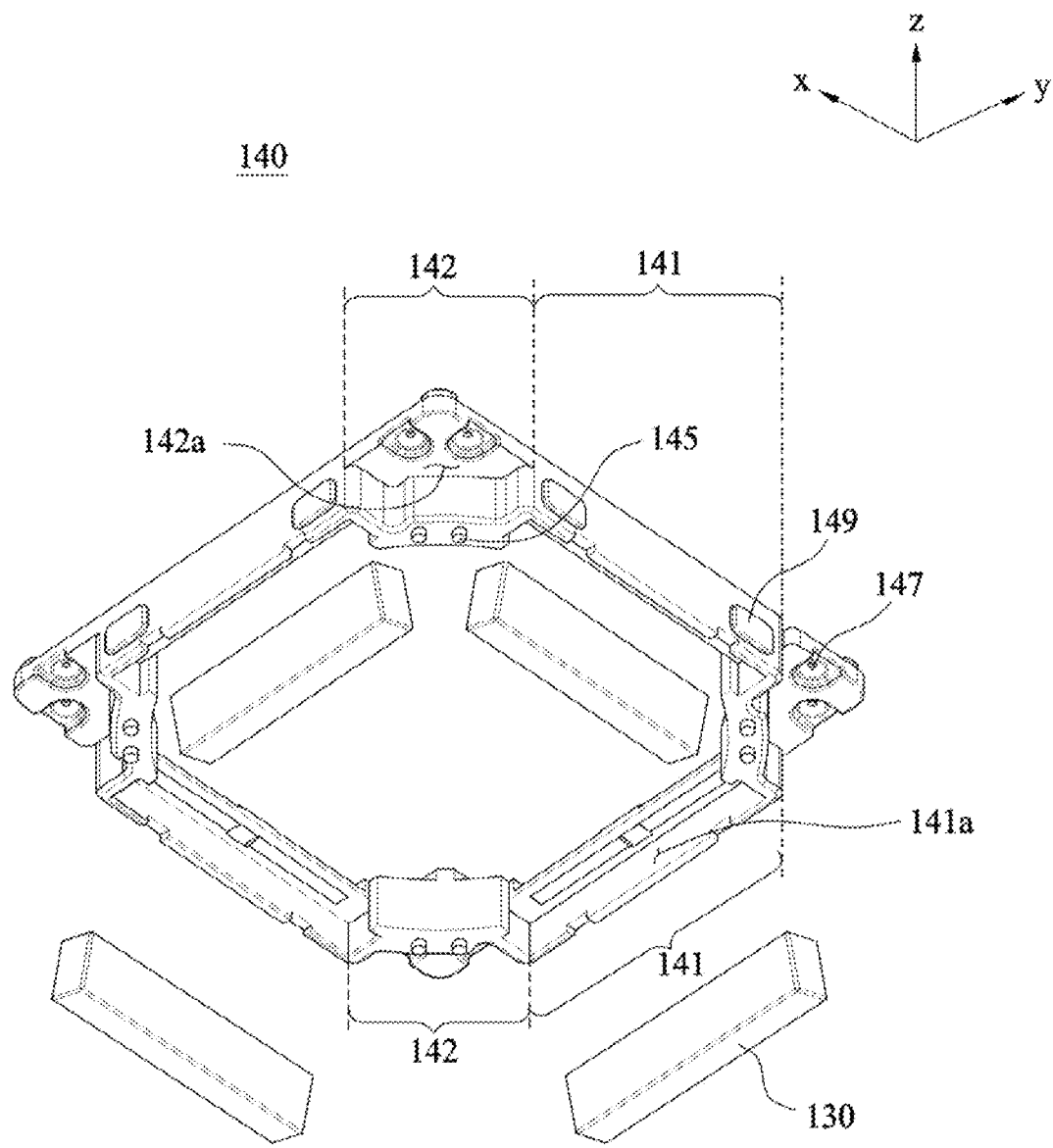
FIG. 7 is a bottom exploded perspective view of the housing and the magnet according to the embodiment.

FIG. 6 is a top perspective view of the housing 140 according to the embodiment. FIG. 7 is a bottom exploded perspective view of the housing 140 and the magnet 130 according to the embodiment.

Referring to FIG. 6, the housing 140 may include first mounting recesses 146, which are formed at positions corresponding to those of the first and second protrusions 111 and 112.

When the bobbin 110 moves in the first direction for the autofocusing function, the first stoppers 111b of the first protrusions 111 and the second protrusions 112 serve to inhibit the bottom surface of the body of the bobbin 110 from directly colliding with the upper surfaces of a base 210 and a printed circuit board 250 even when the bobbin 110 moves beyond a predetermined range due to external impacts or the like. To this end, the first stoppers 111b may protrude from the outer circumferential surface of the bobbin 110 in the radial direction, that is, in the second or third direction, so as to be longer than the guide portions 111a, and the second protrusions 112 may also protrude in the lateral direction so as to be larger than the upper surfaces thereof on which the upper elastic member 150 is mounted.

Referring to FIG. 6, when the state in which the bottom surfaces of the first and second protrusions 111 and 112 are in contact with the bottom surfaces of the first mounting recesses 146 is set be the initial position, the autofocusing function may be controlled as in the unidirectional control of a conventional voice coil motor (VCM). Specifically, the autofocusing function may be fulfilled in such a manner that the bobbin 110 is raised when current is supplied to the first coil unit 120 and is lowered when the supply of current is interrupted.

However, when the state in which the bottom surfaces of the first and second protrusions 111 and 112 are spaced apart from the bottom surfaces of the first mounting recesses 146 by a predetermined distance is set to be the initial position, the autofocusing function may be controlled in accordance with the direction of current as in the bidirectional control of a conventional voice coil motor. Specifically, the autofocusing function may be fulfilled by moving the bobbin 110 upward or downward. For example, the bobbin 110 may be moved upward upon the application of forward current and may be moved downward upon the application of reverse current.

The housing 140 may include third protrusions 148, which are provided at positions corresponding to spaces each having a first width W1, which are defined between the first and second protrusions 111 and 112. The surfaces of the third protrusions 148 that face the bobbin 110 may have the same shape as the side surface of the bobbin 110. At this point, the first width W1 between the first and second protrusions 111 and 112, shown in FIG. 4, and the second width W2 between the third protrusions 148, shown in FIG. 6 may be set to have a predetermined tolerance therebetween. Accordingly, the displacement of the third protrusions 148 between the first and second protrusions 111 and 112 may be restricted. As a result, even though the bobbin 110 is subjected to a force tending to rotate the bobbin 110 about the optical axis rather than a force tending to move the bobbin 110 in the first direction, it is possible to inhibit the rotation of the bobbin 110 by means of the third protrusions 148.

According to the embodiment, the first sensor 170 may be disposed, coupled or mounted on the bobbin 110, and may thus be moved with the bobbin 110. The first sensor 170 may detect displacement in the first direction of the bobbin 110, and may output the detected result as a feedback signal. By using the detected result which is obtained by detecting displacement of the bobbin 110 in the first direction or in the direction parallel to the first direction using the feedback signal, displacement of the bobbin 110 in the first direction or the direction parallel to the first direction may be adjusted.

The first sensor 170 may be disposed, coupled or mounted on the housing 140 in various manners, and may receive current in various fashions depending on the manner in which the first sensor 170 is disposed, coupled or mounted.

According to one embodiment, the first sensor 170 may be coupled to the housing 140 and an additional magnet (not shown), which faces the first sensor 170, may be disposed on the bobbin 110. The first sensor 170 may be disposed, coupled or mounted on side surfaces or corners of the first mounting recess 146 of the housing 140 shown in FIG. 6 (for example, the surface of the third protrusion 148). In this case, by the magnetic force which is exerted on the magnet 130 from the additional sensor magnet, the bobbin 110, which is moved in the first direction, that is, the optical axis direction or the direction parallel to the first direction, may be tilted, and the accuracy of the feedback signal may be deteriorated. In consideration of this, another additional sensor magnet may be disposed, coupled or mounted on the bobbin 110 at a position at which the interaction between the first additional sensor magnet and the magnet 130 is minimized.

According to another embodiment, the first sensor 170 may be directly disposed, coupled or mounted on the outer circumferential surface of the bobbin 110. In this case, surface electrodes (not shown) may be provided on the outer circumferential surface of the bobbin 110, and the first sensor 170 may receive current through the surface electrodes.

According to a further embodiment, the first sensor 170 may be indirectly disposed, coupled or mounted on the bobbin 110, as shown in the drawings. For example, the first sensor 170 may be disposed, coupled or mounted on the sensor substrate 180, and the sensor substrate 180 may be coupled to the bobbin 110. In other words, the first sensor 170 may be indirectly disposed, coupled or mounted on the bobbin 110 through the sensor substrate 180.

When the first sensor 170 is directly or indirectly disposed to the bobbin 110 as in the other and further embodiments, the sensor magnet may be disposed independently from the magnet 130, and the magnet 130 may be used as the sensor magnet.

Hereinafter, although the case in which the first sensor 170 is indirectly disposed, coupled or mounted on the bobbin 110 through the sensor substrate 180 and the magnet 130 is used as the sensor magnet will be described, the embodiments are not limited thereto.

Referring to FIGS. 4 and 5A, the bobbin 110 may be provided on the outer side surface thereof with a support groove 114, and the sensor substrate 180 may be fitted into the support groove 114 so as to be coupled to the bobbin 110. Although the sensor substrate 180 may have, for example, a ring shape, as shown in the drawings, the embodiments are not limited as to the shape of the sensor substrate 180. The support groove 114 may be defined between the outer circumferential surface of the bobbin 110 and the first and second protrusions 111 and 112. At this point, the first sensor 170 may have a shape capable of being disposed, coupled or mounted on the sensor substrate 180. As shown in FIGS. 4 and 5B, the first sensor 170 may be disposed, coupled or mounted on, for example, an upper area A1, an intermediate area A2 and a lower area A3 of the outer surface of the sensor substrate 180 in various manners. The first sensor 170 may receive current from the outside through the circuit of the sensor substrate 180. For example, a mounting hole 183 may be formed in the outer surface of the sensor substrate 180, and the first sensor 170 may be disposed, coupled or mounted in the mounting hole 183, as shown in FIG. 5B. At least one surface of the mounting hole 183 may be configured to have an inclined surface (not shown) so as to allow more efficient injection of epoxy or the like for assembly of the first sensor 170. Although additional epoxy or the like may not be injected into the mounting hole 183, the epoxy or the like may be injected so as to increase the disposition stability, coupling force or mounting force of the first sensor 170.

Alternatively, the first sensor 170 may be attached to the outer surface of the sensor substrate 180 by means of an adhesive, such as epoxy or double-sided adhesive tape, as shown in FIG. 4. As illustrated in FIG. 4, the first sensor 170 may be disposed, coupled or mounted on the center of the sensor substrate 180.

The bobbin 110 may have a reception recess 116, which is suitable for receiving the first sensor 170, which is disposed, coupled or mounted on the sensor substrate 180. The reception recess 116 may be formed between the first and second protrusions 111 and 112.

The sensor substrate 180 may a body 182, elastic member contacts 184-1, 184-2, 184-3 and 184-4, and circuit patterns L1, L2, L3 and L4.

When the support groove 114, which is defined between the outer surface of the bobbin 110 and the first and second protrusions 111 and 112, has the same shape as the outer surface of the bobbin 110, the body 182 of the sensor substrate 180 may have a shape capable of being securely fitted into the support groove 114. Although the support groove 114 and the body 182 may have a circular cross-sectional shape, as shown in FIG. 3 to FIG. 5A, the embodiments are not limited thereto. According to another embodiment, the support groove 114 and the body 182 may have a polygonal cross-sectional shape.

The body 812 of the sensor substrate 180 may include a first segment, on the outer surface of which the first sensor 170 is disposed, coupled or mounted, and a second segment, which contacts the first segment and extends therefrom. Although the sensor substrate 180 may have an opening in a region facing the first segment so as to be easily fitted into the support groove 114, the embodiments are not limited to a specific shape of the sensor substrate 180.

The elastic member contacts 184-1, 184-2, 184-3 and 184-4 may protrude from the body 182 in the direction which allows the elastic member contacts 184-1, 184-2, 184-3 and 184-4 to contact the first frame 151, for example, in the first direction, that is, the optical axis direction or in the direction parallel to the first direction. The elastic member contacts 184-1, 184-2, 184-3 and 184-4 are the portions that are connected to the first inner frame 151 of the upper elastic member 150, which will be described later.

The circuit patterns L1, L2, L3 and L4 may be formed on the body 182, and may conductively connect the first sensor 170 and the elastic member contacts 184-1, 184-2, 184-3 and 184-4. For example, the first sensor 170 may be embodied as a Hall sensor, but may alternatively be embodied as any sensor as long as it is able to detect variation in magnetic force.

If the first sensor 170 is embodied as a Hall sensor, the Hall sensor 170 may have a plurality of pins. For example, the plurality of pins may include a first pin and a second pin. Referring to FIG. 5C, the first pin may include, for example, a first of first pin P11 and a second of first pin P12, which are respectively connected to the voltage and to ground, and the second pin may include a first of second pin P21 and a second of second pin P22, which output the detected result. At this point, although the detected result, that is, the feedback signal which is output through the first of second pin P21 and the second of second pin P22, may be of current type, the embodiments are not limited as to the kind of feedback signal.

The first of first, second of first, first of second and second of second pins P11, P12, P21 and P22 of the first sensor 170 may be conductively connected to the elastic member contacts 184-1, 184-2, 184-3 and 184-4 through the circuit patterns L1, L2, L3 and L4, respectively. Referring to FIG. 5C, the first of first, second of first, first of second and second of second pins P11, P12, P21 and P22 may be connected to the fourth, third, second and first elastic member contacts 184-1, 184-3, 184-2 and 184-1 through the circuit patterns, that is, the first, second, third and fourth lines L1, L2, L3 and L4, respectively. According to an embodiment, the first, second, third and fourth lines L1, L2, L3 and L4 may be constructed to be visible to the naked eye. According to another embodiment, the first, second, third and fourth lines L1, L2, L3 and L4 may be formed in the body 182 so as to be invisible to the naked eye.

Figure 8:
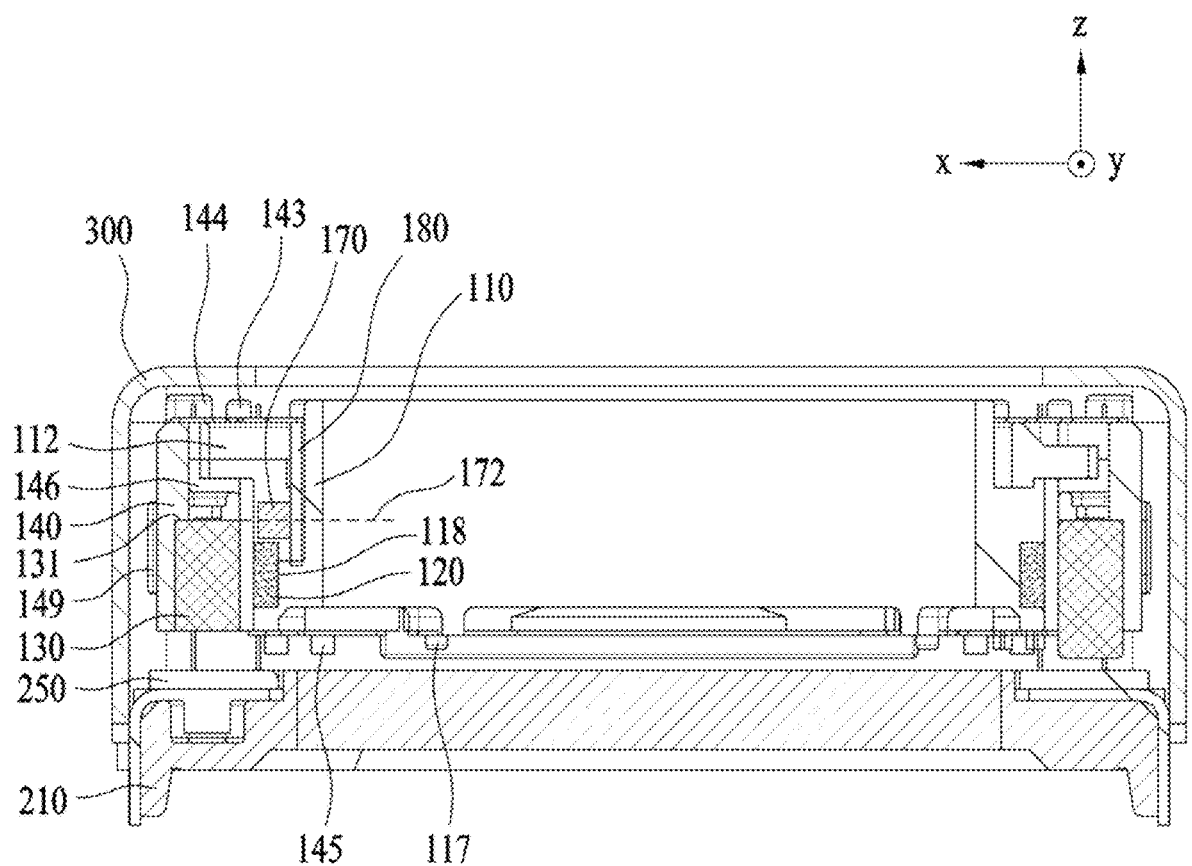
FIG. 8 is a cross-sectional view taken along line I-I' of FIG. 3.

FIG. 8 is a cross-sectional view taken along line I-I' of FIG. 3.

Referring to FIG. 8, the first sensor 170 may be disposed to face the magnet 130 such that the imaginary center horizontal line 172, which extends through the center of the first sensor 170 in the optical axis direction and intersects the optical axis, is aligned with the upper end 131 of the magnet 130.

At this point, although the bobbin 110 may be moved upward and downward in the optical axis direction, that is, in the first direction or in the direction parallel to the first direction with respect to the reference point at which the imaginary center horizontal line 172 coincides with the upper end 131 of the magnet 130, the embodiments are not limited thereto.

Figure 9:
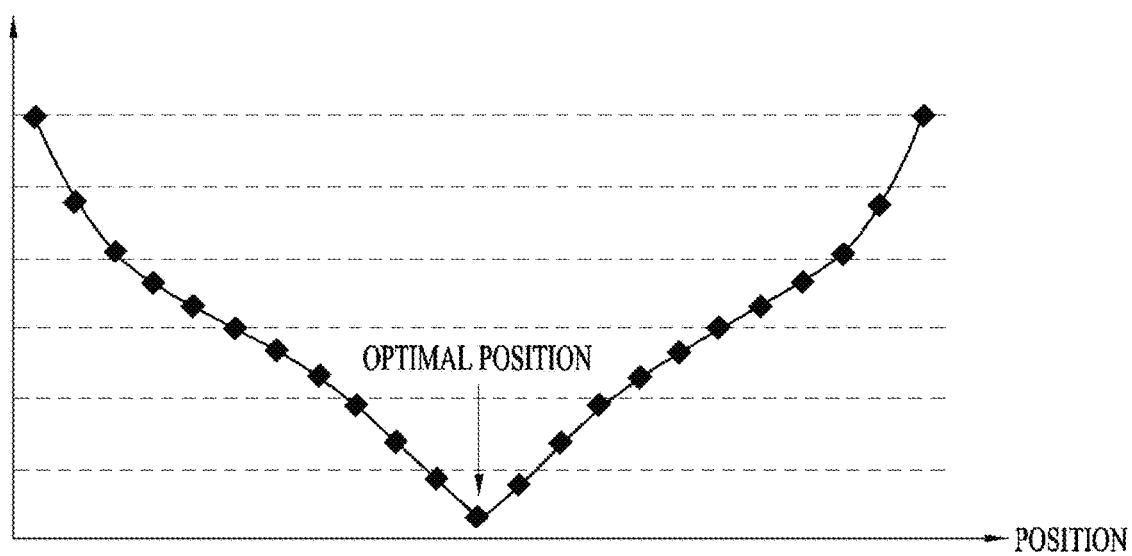
FIG. 9 is a graph illustrating the accuracy of the first sensor as a function of the position of the first sensor.

FIG. 9 is a graph illustrating the accuracy of the first sensor 170 as a function of the position of the first sensor 170, in which the horizontal axis represents the position of the first sensor 170 and the vertical axis represents the accuracy of the first sensor 170.

Referring to FIGS. 8 and 9, it will be appreciated that the efficiency of sensing by the first sensor 170 is maximized when the imaginary center horizontal line 172 coincides with the upper end 131 of the magnet 130.

Figure 10:
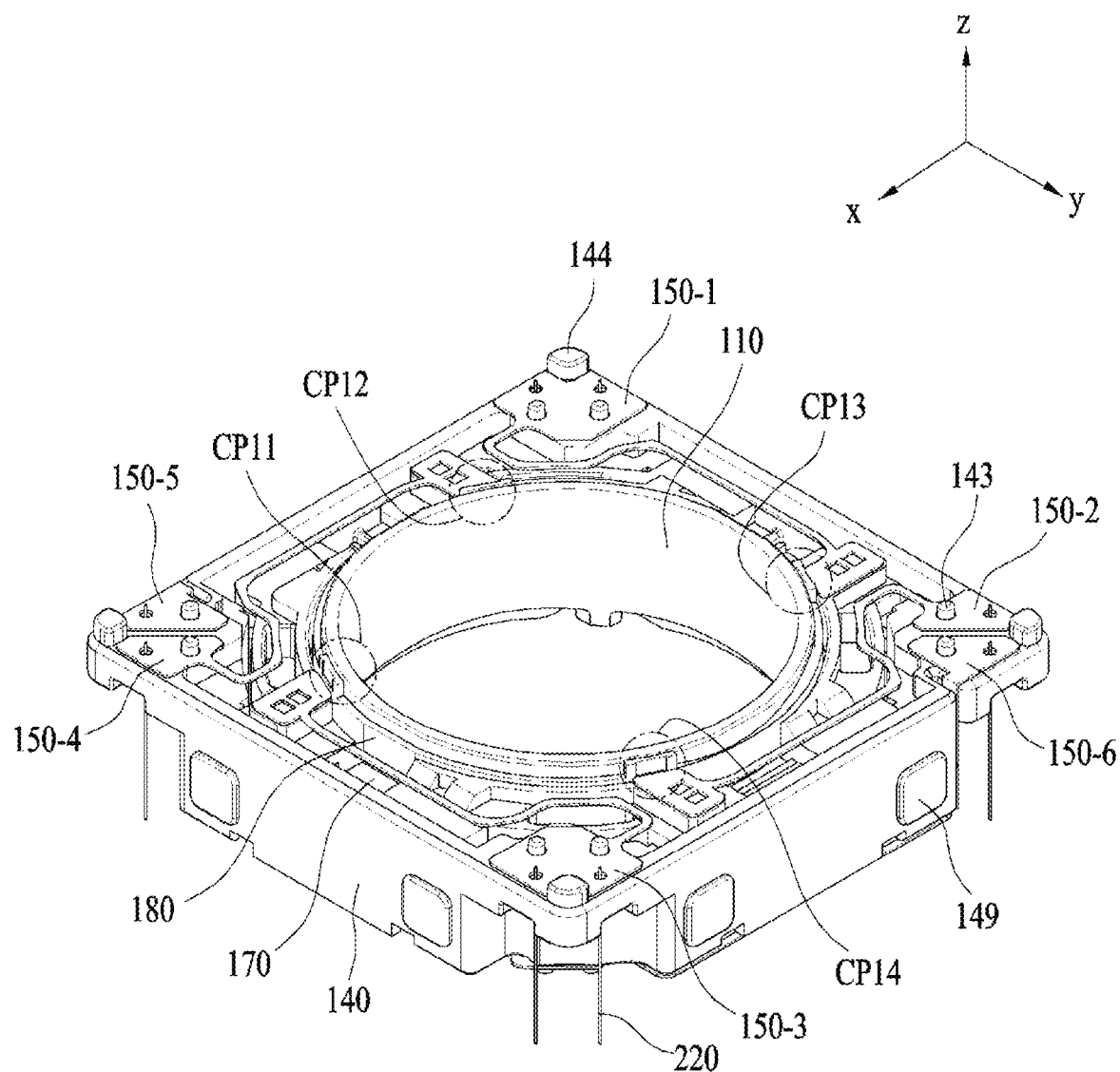
FIG. 10 is a top perspective view of the bobbin, the housing, the upper elastic member, the first sensor, the sensor substrate and a plurality of support members, all of which are coupled to one another.

FIG. 10 is a top perspective view of the bobbin 110, the housing 140, the upper elastic member 150, the first sensor 170, the sensor substrate 180 and a plurality of support members 220, all of which are coupled to one another.

Figure 11:
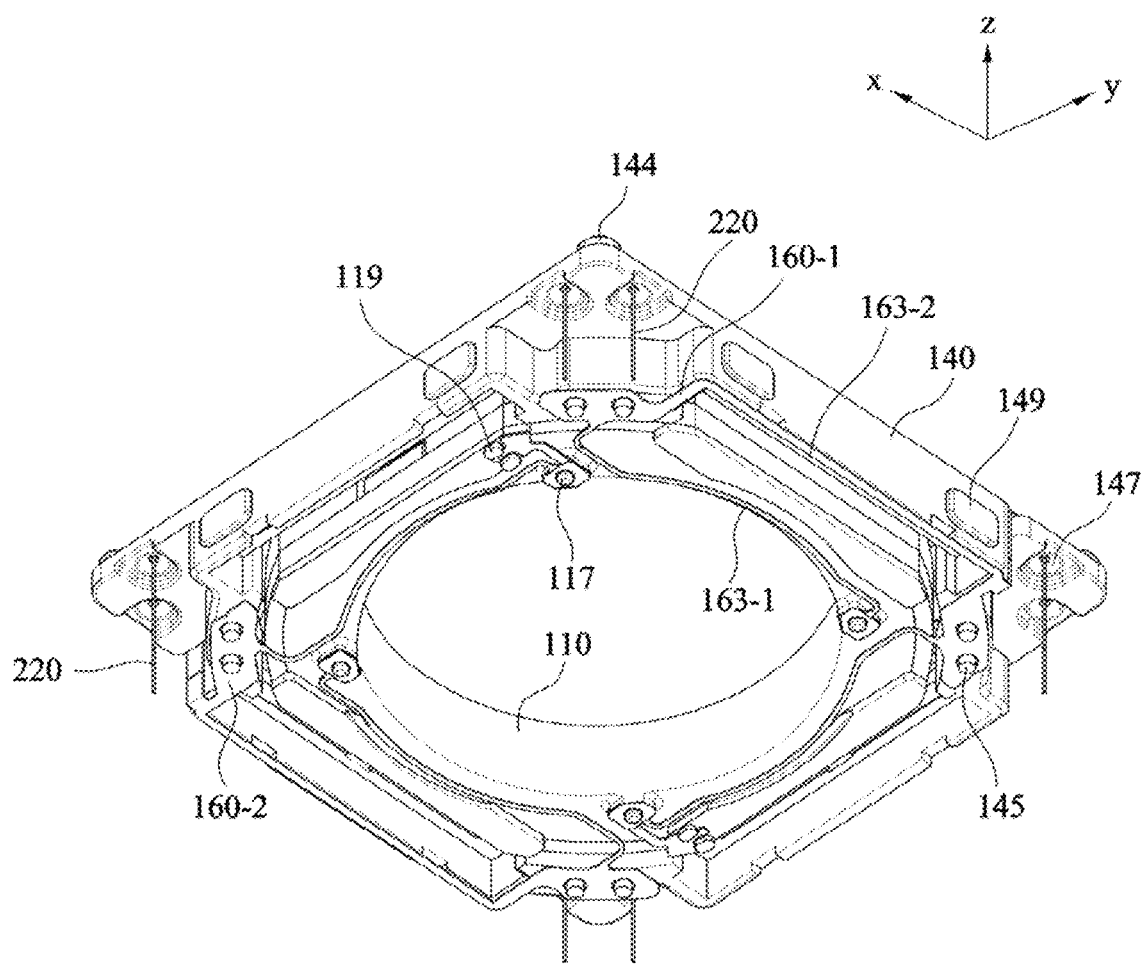
FIG. 11 is a bottom perspective view of the bobbin, the housing, the lower elastic member and the plurality of support members, all of which are coupled to one another.

FIG. 11 is a bottom perspective view of the bobbin 110, the housing 140, the lower elastic member 160 and the plurality of support members 220, all of which are coupled to one another.

The first coil unit 120 may be wound around the outer circumferential surface of the bobbin 110 by a worker or a machine, and then both ends, that is, the start line and the end line of the first coil unit 120 may be respectively wound around a pair of winding protrusions 119 protruding from the bottom surface of the bobbin 110 in the first direction, and may be secured thereto. At this time, the position of the end line of the first coil unit 120, which is wound around the winding protrusion 119, may vary depending on the worker. As illustrated in FIG. 11, although the pair of winding protrusions 119 may be disposed at positions that are symmetrical about the center of the bobbin 110, the embodiments are not limited thereto.

As illustrated in FIG. 8, the first coil unit 120 may be fitted and coupled in a coil groove 118, which is formed in the outer circumferential surface of the bobbin 110. As illustrated in FIG. 2, although the first coil unit 120 may be embodied as a polygonal coil block, the embodiments are not limited thereto. According to another embodiment, the first coil unit 120 may be directly wound around the outer circumferential surface of the bobbin 110, or may be wound through a coil ring (not shown). The coil ring may be coupled to the bobbin 110 in the same manner as the sensor substrate 180 fitted in the support groove 114, and the first coil unit 120 may be wound around the coil ring rather than being wound or disposed around the bobbin 110. In any case, the start line and the end line of the first coil unit 120 may be respectively wound around the pair of winding protrusions 119 and secured thereto, and other constructions are the same.

As shown in FIG. 2, the first coil unit 120 may be configured to have an approximately octagonal shape. This is because the outer circumferential surface of the bobbin 110, which corresponds to the first coil unit 120, has the octagonal shape, as illustrated in FIG. 5A. At least four surfaces among the surfaces of the first coil unit 120 may be configured to be linear, and the corner surfaces connected between the four surfaces may also be configured to be linear. However, the embodiments are not limited thereto, and the surfaces may be configured to be rounded.

The linear surfaces of the first coil unit 120 may be configured to correspond to the magnets 130. The surfaces of the magnets 130, which correspond to the surfaces of the first coil unit 120, may have the same radius of curvature as the surfaces of the first coil unit 120. Specifically, the surfaces of the magnets 130 may be linear when the surfaces of the coils 120 are linear, whereas the surfaces of the magnets 130 may be rounded when the surfaces of the coils 120 are rounded. However, even if the surfaces of the first coil unit 120 are rounded, the surfaces of the magnets 130 may be linear, and vice versa.

The first coil unit 120, which is intended to move the bobbin 110 in the first direction parallel to the optical axis or the direction parallel to the first direction so as to fulfill the autofocusing function, may generate electromagnetic force through the interaction between the magnets 130 and the first coil unit 120 upon the supply of current. The generated electromagnetic force may move the bobbin 110 in the first direction or in the direction parallel to the first direction.

The first coil unit 120 may be configured to correspond to the magnets 130. In other words, if the magnets 130 are constructed form a single magnet body and the entire inner surface of the magnet 130, which faces the outer surface of the first coil unit 120, has the same polarity, the outer surface of the first coil unit 120, which corresponds to the inner surface of the magnet 130, may have the same polarity.

Alternatively, the magnet 130 may be divided into two or four magnets and thus the inner surface of the magnet 130, which faces the outer surface of the first coil unit 120, may also be divided into two or four surfaces, in which case the first coil unit 120 may also be divided into a number of coils that corresponds to the number of the divided magnets 130.

The magnet 130 may be disposed at the position corresponding to that of the first coil unit 120. Referring to FIG. 8, the magnet 130 may be disposed to face the first coil unit 120 as well as the first sensor 170. This is the case in which the magnet 130 is used as the magnet for the first sensor 170 without providing an additional magnet for the first sensor 170 as in one embodiment.

In this case, the magnet 130 may be received in a first side portion 141 of the housing 140, as shown in FIG. 7. The magnet 130 may be configured to have an approximately cuboid shape corresponding to that of the first side portion 141 of the housing 140, and the surface of the magnet 130 that faces the first coil unit 120 may be configured to have a curvature corresponding to that of the corresponding surface of the first coil unit 120.

The magnet 130 may be constituted by a single magnet body. Referring to FIG. 5A, which shows the embodiment, the magnet 130 may be oriented such that the inner surface of the magnet 130 that faces the first coil unit 120 serves as an S pole, whereas the outer surface of the magnet 130 serves as an N pole 134. However, the embodiments are not limited thereto, and the inverted disposition is also possible.

Two or more magnets 130 may be provided. According to the embodiment, four magnets 130 may be provided. As shown in FIG. 5A, the magnet 130 may be configured to have an approximately rectangular shape when viewed in a plan view. Alternatively, the magnet 130 may be configured to have a triangular shape or a rhombus shape.

Although the surface of the magnet 130 that faces the first coil unit 120 may be linear, the embodiments are not limited thereto. If the corresponding surface of the first coil unit 120 is rounded, the magnet 130 may be rounded so as to have a curvature corresponding to that of the rounded surface of the first coil unit 120. By virtue of this configuration, it is possible to maintain a constant distance between the magnet 130 and the first coil unit 120. In the embodiment, the magnets 130 may be disposed one at each of the four first side portions 141 of the housing 140. However, the embodiments are not limited thereto. In some designs, only one of the surface of the magnet 130 and the surface of the first coil unit 120 may be a flat surface whereas the other surface may be a curved surface. Furthermore, both the mating surfaces of the first coil unit 120 and the magnet 130 may be curved surfaces. In this case, the mating faces of the first coil unit 120 and the magnet 130 may have the same curvature.

When the magnets 130 have a rectangular shape when viewed in a plan view, a pair of magnets 130 among the plurality of magnets 130 may be oriented parallel to each other in the second direction, and the other pair of magnets 130 may be oriented parallel to each other in the third direction. Thanks to this configuration, it is possible to implement the movement control of the housing 140 for the handshake correction.

The housing 140 may have a polygonal shape when viewed in a plan view. Although the outer contour of the upper end of the housing 140 may have a square shape, as shown in FIG. 6, which shows the embodiment, the inner contour of the lower end of the housing 140 may have an octagonal shape, as shown in FIGS. 6 and 7. Accordingly, the housing 140 may include a plurality of side portions, for example, four first side portions 141 and four second side portions 142.

The first side portions 141 may be the portions on which the magnets 130 are mounted, and the second side portions 142 may be the portions on which the support members 220 are mounted. The first side portions 141 may connect the second side portions 142 to each other, and may include flat surfaces having a predetermined depth.

According to the embodiment, the first side portions 141 may be configured to have a surface area equal to or larger than that of the magnets 130. Referring to FIG. 7, the magnets 130 may be held in magnet mounting portions 141a, which are formed at lower portions of inner surfaces of the first side portions 141. The magnet mounting seat portions 141a may be embodied as recesses having a size corresponding to that of the magnets 130, and may be disposed so as to face at least three surfaces, that is, opposite lateral side surfaces and the upper surface of the magnets 130. The magnet mounting portions 141a may have openings, which are provided in the bottom surfaces thereof and which face the second coil unit 230, such that the bottom surfaces of the magnets 130 directly face the second coil unit 230.

Although the magnets 130 may be secured to the magnet mounting portions 141a using an adhesive, an adhesive member such as a piece of double-sided adhesive tape may alternatively be used without limitation. Alternatively, the magnet mounting portions 141a may be embodied as magnet mounting holes into which the magnets 130 are partially fitted or through which the magnets 130 are partially exposed, unlike the recessed structure shown in FIG. 7.

The first side portions 141 may be disposed parallel to the side surfaces of the cover member 300. The first side portions 141 may be configured to have a larger area than the second side portions 142. The second side portions 142 may define passages through which the support members extend. Upper portions of the second side portions 142 may include first through holes 147. The support members 220 may extend through the first through holes 147 and may be connected to the upper elastic member 150.

The housing 140 may further include second stoppers 144. The second stoppers 144 may inhibit the upper surface of the housing 140 from directly colliding with the inner surface of the cover member 300 shown in FIG. 1.

The housing 140 may further include a plurality of first upper support protrusions 143 formed on the second side portions 142. The plurality of first upper support protrusions 143 may have a hemispherical shape, as shown in the drawings, or may have a circular cylindrical shape or a rectangular column shape. However, the embodiments are not limited as to the shape of the first upper support protrusions 143.

Referring to FIGS. 6 and 7, the housing 140 may be provided with first recesses 142a formed in the side portions 142. The first recesses 142a are provided so as to provide paths, through which the support members 220 extend, as well as spaces which will be filled with gel-type silicone. In other words, the first recesses 142 may be filled with damping silicone.

Figure 12:
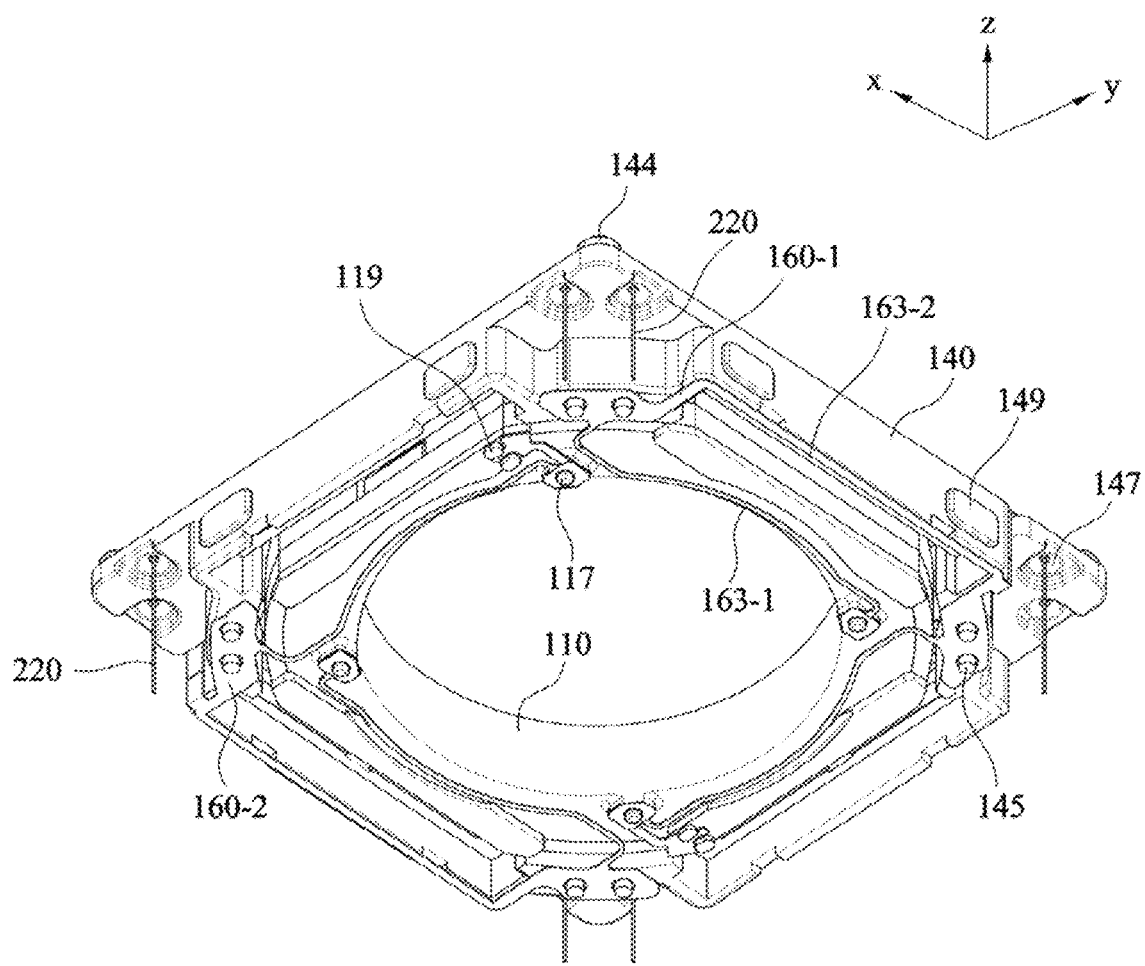
FIG. 12 is a perspective view showing the upper elastic member, the lower elastic member, the first sensor, the sensor substrate, the base, the support members and the circuit board according to the embodiment, all of which are coupled to one another.

FIG. 12 is a perspective view showing the upper elastic member 150, the lower elastic member 160, the first sensor 170, the sensor substrate 180, the base 210, the support members 220 and the circuit board 250 according to the embodiment, all of which are coupled to one another.

According to the embodiment, the upper elastic member 150 may include at least four upper elastic members, that is, first to fourth upper elastic members 150-1, 150-2, 150-3 and 150-4. The elastic member contacts 184-1, 184-2, 184-3 and 184-4, which are connected to the first sensor 170, may be connected to the plurality of support members 220 through the first to fourth upper elastic members 150-1, 150-2, 150-3 and 150-4.

Each of the first and third upper elastic members 150-1 and 150-3 may include the first inner frame 151 and the first frame connector 153, and each of the second and fourth upper elastic members 150-2 and 150-4 may include the first inner frame 151 and the first frame connector 153. The first inner frame 151 may be coupled to the bobbin 110 and the associated elastic member contacts 184-1, 184-2, 184-3 and 184-4. As shown in FIG. 4, when the upper surface 112a of the second protrusion 112 is flat, the first inner frame 151 may be placed on the upper surface 112a, and may be secured thereto by means of an adhesive member. According to another embodiment, when a support protrusion (not shown) is formed on the upper surface 112a, unlike the one embodiment shown in FIG. 4, the support protrusion may be inserted into a first of second through hole 151a formed in the first inner frame 151, and may be secured thereto through thermal fusion or by means of an adhesive such as epoxy.

The first frame connector 153 may be bent at least one time to define a predetermined pattern. The upward and/or downward movement of the bobbin 110 in the first direction, parallel to the optical axis, may be flexibly supported by change of position and fine deformation of the first frame connector 153.

The plurality of first upper support protrusions 143 of the housing 140 may couple and secure the upper elastic member 150 to the housing 140, as illustrated in FIG. 12. According to the embodiment, the upper elastic member 150 may be provided with second of second through holes 157 at positions corresponding to the first upper support protrusions 143 of the upper elastic member 150. The upper support protrusions 143 and the second of second through holes 157 may be coupled to each other through thermal fusion or by means of an adhesive such as epoxy. In order to secure the plurality of first to fourth upper elastic members 150-1, 150-2, 150-3 and 150-4, a sufficient number of first upper support protrusions 143 may be provided. Accordingly, it is possible to inhibit the first to fourth upper elastic members 150-1, 150-2, 150-3 and 150-4 and the housing 140 from being unreliably coupled to each other.

The distance between the plurality of first upper support protrusions 143 may be appropriately set such that the first upper support protrusions do not interfere with peripheral components. Specifically, the first upper support protrusions 143 may be disposed at the corners of the housing 140 at regular intervals so as to be symmetrical about the center of the bobbin 110, or may be disposed at irregular intervals so as to be symmetrical based on a specific imaginary line extending through the center of the bobbin 110.

After the first inner frame 151 is coupled to the bobbin 110 and the upper elastic member 150 is coupled to the housing 140, conductive connecting members CP11, CP12, CP13 and CP14, such as solder, may be provided between the elastic member contacts 184-1, 184-2, 184-3 and 184-4 of the sensor substrate 180 and the first inner frame 151, as shown in FIG. 10, so as to enable power having different polarities to be applied to two pins P11 and P12 among the four pins P11, P12, P13 and P14 of the first sensor 170 and to enable different feedback signals to be output from the other two pins P21 and P22. In order to enable the application of power having different polarities and the output of different feedback signals in this way, the upper elastic member 150 may be divided into the first to fourth upper elastic members 150-1, 150-2, 150-3 and 150-4.

The first to fourth upper elastic members 150-1, 150-2, 150-3 and 150-4 are connected to the circuit board 250 through the support members 220. Accordingly, the first sensor 170 may receive power supplied from the circuit board 250 through the support members 220 and the upper elastic member 150, or may output feedback signals and provide the feedback signals to the circuit board 250.

The lower elastic member 160 may include a first lower elastic member 160-1 and a second lower elastic member 160-2, which are conductively isolated from each other. The first coil unit 120 may be connected to the plurality of support members 220 through the first and second lower elastic members 160-1 and 160-2.

Each of the first and second lower elastic members 160-1 and 160-2 may include at least one of the second frame connectors 163-1 and 163-2.

The first and second lower elastic members 160-1 and 160-2 may receive power having different polarities and may transmit the power to the first coil unit 120. In order to enable the application of power having different polarities and transmission of the power to the first coil unit 120 in this way, the lower elastic member 160 may be divided into the first and second lower elastic members 160-1 and 160-2.

At least one of the first of second and second of second frame connectors 163-1 and 163-2, may be bent at least one time to define a predetermined pattern. Particularly, the upward and/or downward movement of the bobbin 110 in the first direction, parallel to the optical axis, may be flexibly supported by change of position and fine deformation of the first of second frame connector 163-1.

At least one of the upper elastic member and the lower elastic member may include the bent portion, which is bent in the first direction, and neither the upper elastic member nor the lower elastic member may include the bent portion, which is bent in the first direction.

It will be appreciated that the first and second lower elastic members 160-1 and 160-2 receive power from the circuit board 250 through the fifth and sixth upper elastic members 150-5 and 150-6, connected to the plurality of support members 220, and provide the power to the first coil unit 120. Specifically, the first lower elastic member 160-1 may be connected to the circuit board 250 through the sixth upper elastic member 160-6 and the sixth support member 220, and the second lower elastic member 160-2 may be connected to the circuit board 250 through the fifth upper elastic member 160-5 and the support member 220.

Referring to FIG. 11, the lower surface of the bobbin 110 may be provided with a plurality of first lower support protrusions 117 so as to couple or secure the lower elastic member 160 and the bobbin 110 to each other. The lower surface of the housing 140 may be provided with a plurality of second lower support protrusions 145 so as to couple or secure the lower elastic member 160 and the housing 140 to each other.

At this point, the number of second lower support protrusions 145 may be larger than the number of first lower support protrusions 117. This is because the second frame connector 163-2 of the lower elastic member 160 is longer than the first frame connector 163-1.

As described above, since the lower elastic member 160 is divided into two lower elastic members, the first and second lower support protrusions 117 and 145 are provided in a sufficient number equal to the number of the first upper support protrusions 143, whereby it is possible to inhibit a gap which would otherwise be created when the lower elastic member 160 is separated.

In the case where the lower elastic member 160 is constituted not by divided segments but by a single body, there is no necessity to provide a large number of first and second lower support protrusions 117 and 145 equal to the number of the first upper support protrusions 143. This is because the lower elastic member 160 can be reliably coupled to the housing 140 by only a small number of first and second lower support protrusions 117 and 145.

However, when the lower elastic member 160 is divided into the first and second lower elastic members 160-1 and 160-2, which are conductively isolated from each other, a sufficient number of first and second lower support protrusions 117 and 145 may be provided in order to hold the divided first and second lower elastic members 160-1 and 160-2. Accordingly, it is possible to inhibit the first and second lower elastic members 160-1 and 160-2 and the housing 140 from being incompletely coupled to each other.

Referring still to FIG. 11, although the first and second lower support protrusions 117 and 145 may be configured to have a hemispheric shape like the first upper support protrusions 143, they may also be configured to have a circular cylindrical or rectangular column shape. However, the embodiments are not limited to the shape.

The distance between the plurality of first lower support protrusions 117 and 145 may be appropriately set such that the first lower support protrusions do not interfere with peripheral components. Specifically, the first and second lower support protrusions 117 and 145 may be disposed at irregular intervals so as to be symmetrical about the center point of the bobbin 110.

Although the upper elastic member 150 and the lower elastic member 160 may be embodied as springs, the embodiments are not limited as to the material of the upper and lower elastic members 150 and 160.

The bobbin 110, the housing 140 and the upper and lower elastic members 150 and 160 may be assembled with each other through thermal fusion and/or a bonding procedure using an adhesive. Here, the assembly may be performed in such a manner as to perform thermal fusion and then a bonding procedure using an adhesive depending on the assembly sequence.

For example, when the first inner frame 151 of the upper elastic member 150 is first assembled in the third assembly, the elastic member contacts 184-1, 184-2, 184-3 and 184-4 of the sensor substrate 180 and the first inner frames 151 of the first to fourth upper elastic members 150-1, 150-2, 150-3 and 150-4 may be coupled to each other through thermal fusion. Thereafter, when the housing 140 and the upper elastic member 150 are coupled to each other in the fourth assembly, the second of second through holes 157 may be bonded to the first upper support protrusions 143 of the housing 140 through the application of an adhesive such as epoxy. However, this assembly sequence may be changed. In other words, the first to third assemblies may be performed through thermal fusion, and the fourth assembly may be performed through bonding. Although thermal fusion may involve deformation such as distortion, the bonding in the fourth assembly may compensate for such deformation.

In the above embodiment, power may be supplied to the first sensor 170 through the two upper elastic members 160, which are conductively isolated from each other, a feedback signal output from the first sensor 170 may be transmitted to the circuit board 250 through two other upper elastic members 150, which are conductively isolated from each other, and power may be supplied to the first coil unit 120 through the two lower elastic members 160, which are conductively isolated from each other. However, the embodiments are not limited thereto.

According to another embodiment, the role of the plurality of upper elastic members 150 and the role of the plurality of lower elastic members 160 may be swapped. Specifically, power may be supplied to the first coil unit 120 through the two upper elastic members 150, which are conductively isolated from each other, power may be supplied to the first sensor 170 through two lower elastic members 160, which are conductively isolated from each other, and a feedback signal output from the first sensor 170 may be transmitted to the circuit board 250 through two other lower elastic members 160. Although not illustrated, this will be readily understood from the drawings.

Hereinafter, the upper and lower elastic members 150 and 160 are briefly described in the case where the role of the upper elastic member 150 and the role of the lower elastic member 160 are swapped. In this case, the lower elastic member may be divided like the shape of the upper elastic member 150 shown in FIG. 10, and the upper elastic member may be divided like the shape of the lower elastic member 160 shown in FIG. 11. Furthermore, the sensor substrate 180 may be coupled to the bobbin 110, and the elastic member contacts of the sensor substrate 180 may protrude toward the lower elastic member 160 rather than toward the upper elastic member 150, and may be coupled to the associated lower elastic members 160.

The lower elastic member may include at least four first to fourth lower elastic members, and the first sensor 170 may be coupled to the plurality of support members 220 through the first to fourth lower elastic members.

Each of the first to fourth lower elastic members may include the first inner frame coupled to the bobbin 110, the first of first outer frame coupled to the housing 140 and connected to the support member 220, and the first frame connector connecting the first inner frame and the first of first outer frame.

The upper elastic member may include at least two first and second upper elastic members, which are separated from each other, and the first coil unit 120 may be coupled to the plurality of support members 220 through the first and second elastic members.

Each of the first and second upper elastic members may include at least one second inner frame coupled to the bobbin 110, at least one second outer frame coupled to the housing 140, and the first of second frame connector connecting the at least one second inner frame and the at least one second outer frame.

At least one of the second outer frames may include a plurality of outer frames, and each of the first and second upper elastic members may further include the second of second frame connector connecting the plurality of second outer frames.

The at least four lower elastic members may further include fifth and sixth lower elastic members, which are separated from each other, and each of the fifth and sixth lower elastic members may be formed in the direction parallel to the first direction and may be coupled to the housing 140. Each of the fifth and sixth lower elastic members may further include the second of first outer frame connected to the support member 220.

Each of the first and second upper elastic members may further include a bent portion, which is bent from the second of second frame connector toward the lower elastic member in the first direction. Each of the fifth and sixth lower elastic members may further include a connecting frame connecting the bent portion and the second of first outer frame.

Alternatively, each of the fifth and sixth lower elastic members may further include a connecting frame, which is bent from the second of first outer frame to the second of second frame connector in the first direction. Here, the bent portion, the connecting frame and the second of first outer frame may be integrally formed.

Alternatively, each of the first and second upper elastic members may further include a bent portion, which is bent from the second of second frame connector to the second of first outer frame in the first direction.

Alternatively, the lens moving apparatus may further include a metal piece, which is inserted or attached to the housing 140, and the second of first outer frame and the third of second frame connector may be connected to each other by means of the metal piece.

Each of the first and second upper elastic members may further include a coil frame connected to the associated one of both end lines of the first coil unit 120 and a third of second frame connector connecting the coil frame and at least one second inner frame.

Referring to FIGS. 3, 6, 7, 10 and 11, the outer side surface of the housing 140 may be provided with a plurality of third stoppers 149. The third stoppers 149 are intended to inhibit the body of the housing 140 from colliding with the cover member 300 when the first lens moving unit moves in the second and/or third directions, that is, to inhibit the side surface of the housing 140 from directly colliding with the inner surface of the cover member 300 upon the application of external impact. As shown in the drawings, although the third stoppers 149 are disposed two to each of the outer surface of the housing 140 with a constant interval therebetween, the embodiments are not limited as to the positions or number of the third stoppers 149.

Although not shown in the drawings, the housing 140 may further be provided at the lower surface thereof with fourth stoppers. The fourth stoppers may project from the lower surface of the housing 140. The fourth stoppers may serve to inhibit the lower surface of the housing 140 from colliding with the base 210 and/or the circuit board 250, which will be described later. In addition, the fourth stoppers may be maintained in the state of being spaced apart from the base 210 and/or the circuit board 250 by a predetermined distance when it is in the initial position and is operating normally. Thanks to this construction, the housing 140 may be spaced apart from the base 210 downward and may be spaced apart from the cover member 300 upward, whereby the housing 140 may be maintained at a constant level in the optical axis direction without interference with other components. Accordingly, the housing 140 may move in the second and/or third directions in the plane perpendicular to the optical axis.

The first lens moving unit according to the embodiment may precisely control the movement of the bobbin 110 by detecting the position of the bobbin 110 in the optical axis direction, that is, the first direction or the direction parallel to the first direction. This may be achieved by feeding the position detected by the first sensor 170 back to the outside through the circuit board 250.

According to one embodiment, in order to move the bobbin 110 in the optical axis direction, that is, the first direction or the direction parallel to the first direction, a magnet (hereinafter referred to as the detecting magnet; not shown), which faces the first sensor 170, may further be provided, in addition to the magnet 130 (hereinafter referred to as the autofocusing magnet) that faces the first coil unit 120. In this embodiment, the interaction between the autofocusing magnet 130 and the first coil unit 120 may be obstructed by the detecting magnet. This is because a magnetic field may be generated by the detecting magnet. Accordingly, in order to inhibit the detecting magnet, which is separately provided, from interacting with the autofocusing magnet 130 or in order to inhibit the bobbin 110 from being tilted but to allow the interaction between the detecting magnet and the autofocusing magnet 130, the first sensor 170 may be disposed to face the detecting magnet. In this case, the first sensor 170 may be disposed, coupled or mounted on the bobbin 110, and the detecting magnet may be disposed, coupled or mounted on the housing 140. Alternatively, the first sensor 170 may be disposed, coupled or mounted on the housing 140, and the detecting magnet may be disposed, coupled or mounted on the bobbin 110.

According to another embodiment, in place of additional disposition of the detecting magnet, the autofocusing magnet may be used as the detecting magnet in order to move the bobbin 110 in the optical axis direction, that is, the first direction or the direction parallel to the first direction. For example, in order for the autofocusing magnet 130 to also serve as the detecting magnet, the first sensor 170 may not be disposed on the housing 140 but may be disposed, coupled or mounted on the bobbin 110 so as to be moved with the bobbin 110. Accordingly, when both the autofocusing magnet and the detecting magnet are present together, problems caused by the interaction between the two magnets may be fundamentally solved. For example, it is not necessary to provide a piece of magnetic field blocking metal (not shown) for minimizing the interaction between the autofocusing magnet and the detecting magnet.

In some cases, the first lens moving unit may further include various devices for improving the autofocusing function, in addition to the first sensor 170. In this case, the positions of the devices or the method or process of receiving power through the circuit board 250 and supplying feedback signals to the circuit board 250 may be identical to those of the first sensor 170.

Referring again to FIG. 2, the second lens moving unit, which serves as a handshake correction lens moving unit, may include the first lens moving unit, the base 210, the plurality of support members 220, the second coil unit 230, the second sensor 240, and the circuit board 250.

Although the first lens moving unit may include the above-mentioned components, the above-mentioned components may be replaced with another optical system capable of fulfilling the autofocusing function. Specifically, the first lens moving unit may be constituted by an optical module using a single lens moving actuator or a variable refractive index actuator, in place of using an autofocusing actuator employing a voice coil motor. In other words, the first lens moving unit may adopt any optical actuator as long as it is capable of fulfilling an autofocusing function. However, there is a need to install the magnet 130 at a position corresponding to the second coil unit 230, which will be described later.

Figure 13:
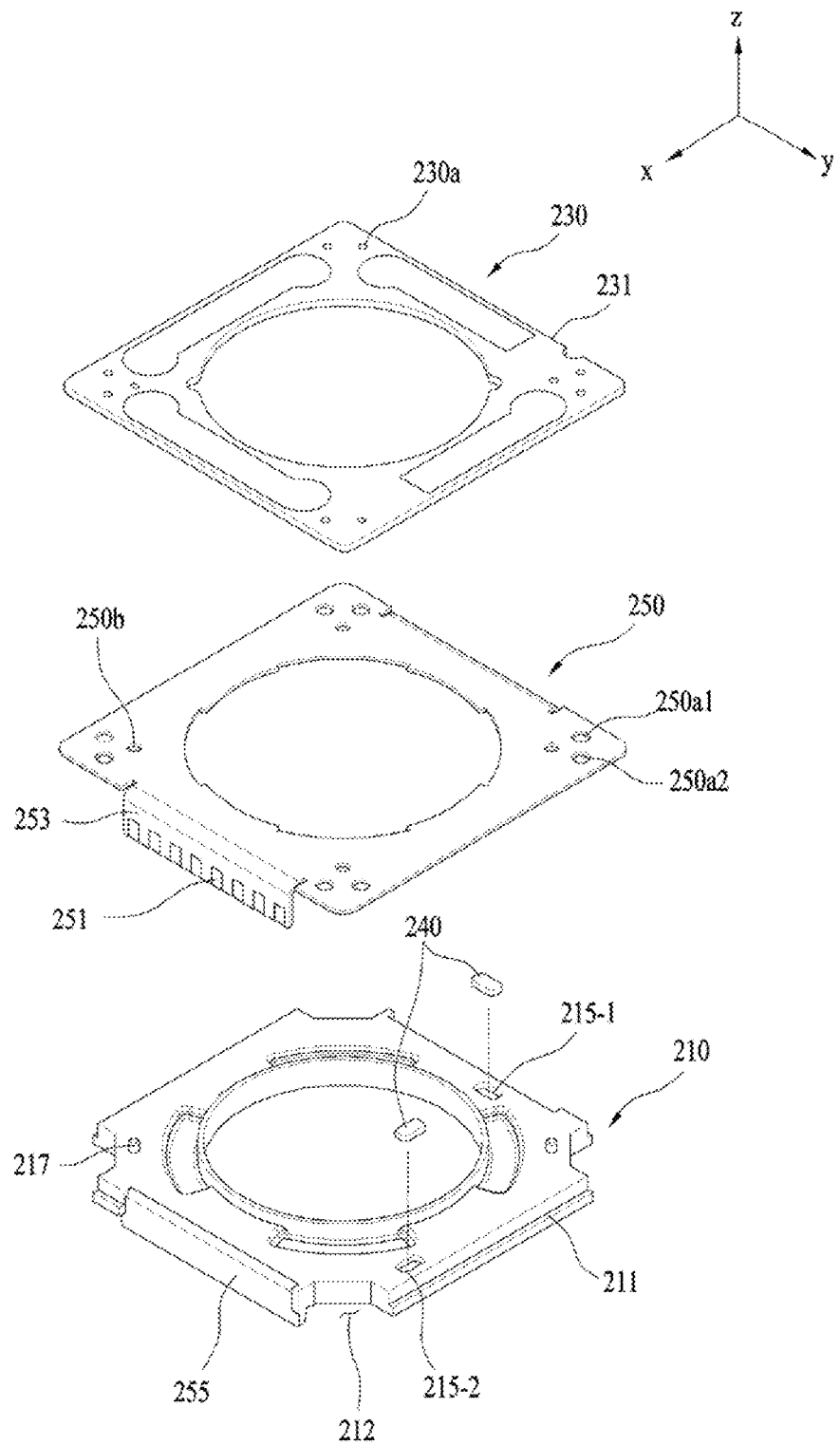
FIG. 13 is an exploded perspective view of the base, the second coil unit and the circuit board.

FIG. 13 is an exploded perspective view of the base 210, the second coil unit 230 and the circuit board 250.

As shown in FIGS. 2 and 13, the base 210 of the second lens moving unit may have an approximately rectangular shape when viewed in a plan view. The base 210 may be provided with stepped portions 211, to which an adhesive is applied when adhesively securing the cover member 300 to the base 210, as illustrated in FIG. 13. The stepped portion 211 may guide the cover member 300, which is coupled on the base 210, and may enable the cover member 300 to contact the base 210 in a surface-contact manner. The stepped portions 211 and the end of the cover member 300 may be adhesively secured to each other and may be sealed shut using an adhesive or the like.

The base 210 may be disposed so as to be spaced apart from the first lens moving unit by a predetermined distance. The base 210 may be provided with a supporting portion 255, which is positioned at the portion of the base 210 at which terminals 251 of the circuit board 250 are formed and which has a size corresponding to that portion of the base 210. The supporting portion 255 may be configured to have a constant cross-sectional area without the stepped portion 211 so as to support a terminal pad 253 having the terminals 251.

The base 210 may have second recesses 212 formed at the corners thereof. When the cover member 300 includes projections formed at the corners thereof, the projections of the cover member 300 may be fitted into the second recesses 212.

The base 210 may be provided in the upper surface thereof with second mounting recesses 215-1 and 215-2 in which the second sensors 240 are disposed. According to the embodiment, two second mounting recesses 215-1 and 215-2 are provided, and the second sensors 240 are respectively disposed in the second mounting recesses 215-1 and 215-2, whereby the second sensors 240 are able to detect the extent by which the housing 140 moves in the second and/or third directions. To this end, the two second mounting recesses 215-1 and 215-2 may be disposed such that the angle defined by two lines connecting the two second sensors 240 and the center of the base 210 is 90°.

Each of the second mounting recesses 215-1 and 215-2 may be provided on at least one surface thereof with an inclined surface (not shown) such that epoxy or the like for the assembly of the second sensors 240 is more easily injected through the inclined surface. The additional epoxy or the like may not be injected into the second mounting recesses 215-1 and 215-2, or may be injected in order to secure the second sensors 240 in place. The second mounting recesses 215-1 and 215-2 may be disposed at positions that are spaced apart from the center of the second coil unit 230 by a predetermined distance. According to the embodiment, the second mounting recesses 215-1 and 215-2 may be formed near the sides of the base 210.

The cover member 300 may be provided with a groove at a position corresponding to the stepped portion 211 of the base 210 so as to allow the injection of an adhesive or the like through the groove. At this point, since the adhesive, which is injected through the groove, has a low viscosity, the adhesive can easily infiltrate between the stepped portion 211 and the end surface of the cover member 300. The adhesive, which is applied to the groove, may fill the gap between the mating surfaces of the cover member 300 and the base 210 through the groove, and thus the cover member 300 may be sealingly coupled to the base 210.

The base 210 may further be provided on the lower surface thereof with a mounting seat (not shown) on which a filter is installed. The filter may be an infrared screening filter. However, the embodiments are not limited thereto, and the base 210 may be provided on the lower surface thereof with an additional sensor holder at which a filter is disposed. The base 210 may be provided on the lower surface thereof with a sensor substrate, on which an image sensor is mounted so as to constitute a camera module.

The plurality of support members 220 may be disposed at the second side portions 142 of the housing 140. As described above, when the housing 140 has, for example, a polygonal shape when viewed in a plan view, the housing 140 may have a plurality of second side portions 142. If the interior of the lower end of the housing 140 has an octagonal shape, the plurality of support members 220 may be disposed at four second side portions 142 among eight side portions. For example, each of the four second side portions 142 may be provided with two support members 220, and a total of eight support members 220 may thus be provided.

Alternatively, among the four second side portions 142 of the housing 140, each of two second side portions 142 may be provided with only one support member 220, and each of the other two second side portions 142 may be provided with two support members 220 with the result that a total of six support members 220 may be provided.

As described above, the support members 220 may serve as the paths for transmitting power required for the first sensor 170 and the first coil unit 120 and the paths for providing the circuit board 250 with the feedback signals output from the first sensor 170.

Furthermore, since the support members 220 serve to return the housing 140 to the normal position after the housing 140 has moved in the second and/or third directions in the first lens moving unit, when the same number of support members 220 are symmetrically disposed in the diagonal direction, the elastic coefficient may be balanced. Specifically, when the housing 140 moves in the second and/or third directions in the plane perpendicular to the optical axis direction, the support members 220 may be finely deformed in the moving direction of the housing 140 or in the length direction of the support members 220. Here, the term "length direction" may refer to the direction connecting the upper end and lower end of each wire of the support members 220. Accordingly, the housing 140 can move only in the second and/or third directions, which are substantially perpendicular to the optical axis, with almost no displacement in the first direction, which is parallel to the optical axis, thus improving the accuracy of handshake correction. This may be obtained by the characteristic whereby the support members 220 are capable of being stretched.

As shown in FIG. 12, the four support members 220, each of which includes a pair of support members, are disposed two at each of four second side portions 142 among the eight side portions so as to support the housing 140 in the state of being spaced apart from the base 210 by a predetermined distance.

The support members 220 according to the embodiment may be respectively disposed at the second side portions 142 of the housing 140 so as to be symmetrical with one another. However, the embodiments are not limited thereto. In other words, the shape and number of the plurality of support members 220 may be set to be symmetrical to one another in the second and third directions, which are perpendicular to the first direction. Considering the above-mentioned elastic coefficient, the number of the support members 220 may be eight.

Although the support members 220 have been described as being embodied as suspension wires without a predetermined pattern in the above embodiment, the embodiments are not limited thereto. According to another embodiment, the support members 200 may be embodied as support plates having elastic deformation portions (not shown).

Referring to FIG. 13, the second coil unit 230 may include fifth through holes 230a, which are formed through the corner regions of a circuit member 231. The support members 220 may extend through the fifth through holes 230a and may be connected to the circuit board 250.

The second coil unit 230 may be disposed to face the magnet 130 secured to the housing 140. For example, the second coil unit 230 may be disposed outside the magnet 130. Alternatively, the second coil unit 230 may be disposed under the magnet 130 so as to be spaced apart from the magnet 130 by a predetermined distance.

According to the embodiment, although the second coil unit 230 may include a total of four second coil units, which are disposed at the four sides of the circuit board 250, as shown in FIG. 13, the embodiments are not limited thereto. Only two coils 230, namely, a second coil unit for the second direction and a second coil unit for the third direction, may be provided, or four or more second coil units 230 may also be provided. According to the embodiment, a circuit pattern may be formed on the circuit board 250 so as to have the shape of the second coil unit 230, and an additional second coil unit 230 may be disposed on the circuit board 250. However, the embodiments are not limited thereto, and only the second coil unit 230 may be disposed on the circuit board 250 without the formation of the circuit pattern having the shape of the second coil unit 230 on the circuit board 250. Alternatively, the second coil unit 230, which is constituted by winding a wire into a doughnut shape or which is constituted by a finely patterned coil, may be conductively connected to the circuit board 250.

The circuit member 231 including the second coil unit 230 may be mounted on the circuit board 250 disposed over the base 210. However, the embodiments are not limited thereto, and the second coil unit 230 may be closely disposed on the base, or may be spaced apart from the base 210 by a predetermined distance. Furthermore, the second coil unit 230 may be formed on an additional substrate, and the substrate may be layered on the circuit board 250 and may be connected thereto.

As described above, the housing 140 may be moved in the second and/or third directions by the interaction of the magnets 130, which are disposed to face each other, and the second coil unit 230, thus implementing handshake correction. To this end, the first to fourth support members 220 may support the housing 140 with respect to the base 210 such that the housing 140 can move in the second and/or third directions, which are perpendicular to the first direction.

The second sensors 240 may detect displacement of the first lens moving unit with respect to the base 210 in the second and/or third directions, which are perpendicular to the optical axis. To this end, the second sensors 240 may be spaced apart from the second coil unit 230 by a predetermined distance in the first direction, with the circuit board 250 disposed therebetween so as to detect movement of the housing 140. In other words, the second sensors 240 are not directly connected to the second coil unit 230, and the circuit board 250 may be provided on the upper surface thereof with the second coil unit 230 and on the lower surface thereof with the second sensors 240. According to the embodiment, the second sensors 240, the second coil unit 230 and the magnet 130 may be disposed on the same axis.

The second sensors 240 may be embodied as Hall sensors, but may alternatively be embodied as any sensor as long as it is capable of detecting variation of magnetic force. As shown in FIG. 13, two second sensors 240 may be disposed near the sides of the base 210 disposed under the circuit board 250, and may be fitted in the second mounting recesses 215-1 and 215-2 formed in the base 210.

The circuit board 250 may include sixth through holes 250a1 and 250A2 through which the support members 220 extend. The support members 220 may extend through the sixth through holes 250A1 and 250A2 in the circuit board 250 and may be conductively connected to the associated circuit patterns, which may be disposed on the lower surface of the circuit board 250, via soldering.

The circuit board 250 may further include seventh through holes 250*b*. The second upper support protrusions 217 of the base 210 and the seventh through holes 250*b* may be coupled as shown in FIG. 12, and may be secured to each other through thermal fusion or by means of an adhesive such as epoxy.

The circuit board 250 may include a plurality of terminals 251. The circuit board 250 may be provided with the bent terminal pad 253. According to the embodiment, the one bent terminal pad 253 of the circuit board 250 may be provided with at least one terminal 251.

According to the embodiment, the plurality of terminals 251 provided on the terminal pad 253 may receive external power, and may supply the power the first and second sensors 170 and 240. Furthermore, the plurality of terminals 251 may output the feedback signals output from the first sensor 170 to the outside. The number of terminals 251 provided on the terminal pad 252 may be increased or decreased depending on the kinds of components to be controlled.

According to the embodiment, although the circuit board 250 may be embodied as an FPCB, the embodiments are not limited thereto. The terminals of the circuit board 250 may be directly formed on the base 210 through a process of forming a surface electrode.

As described above, the circuit board 250 may supply power (or current) required for the first coil unit 120 and the first sensor 170, and may receive the feedback signals from the first sensor 170 so as to adjust the displacement of the bobbin 110.

Figure 14A:
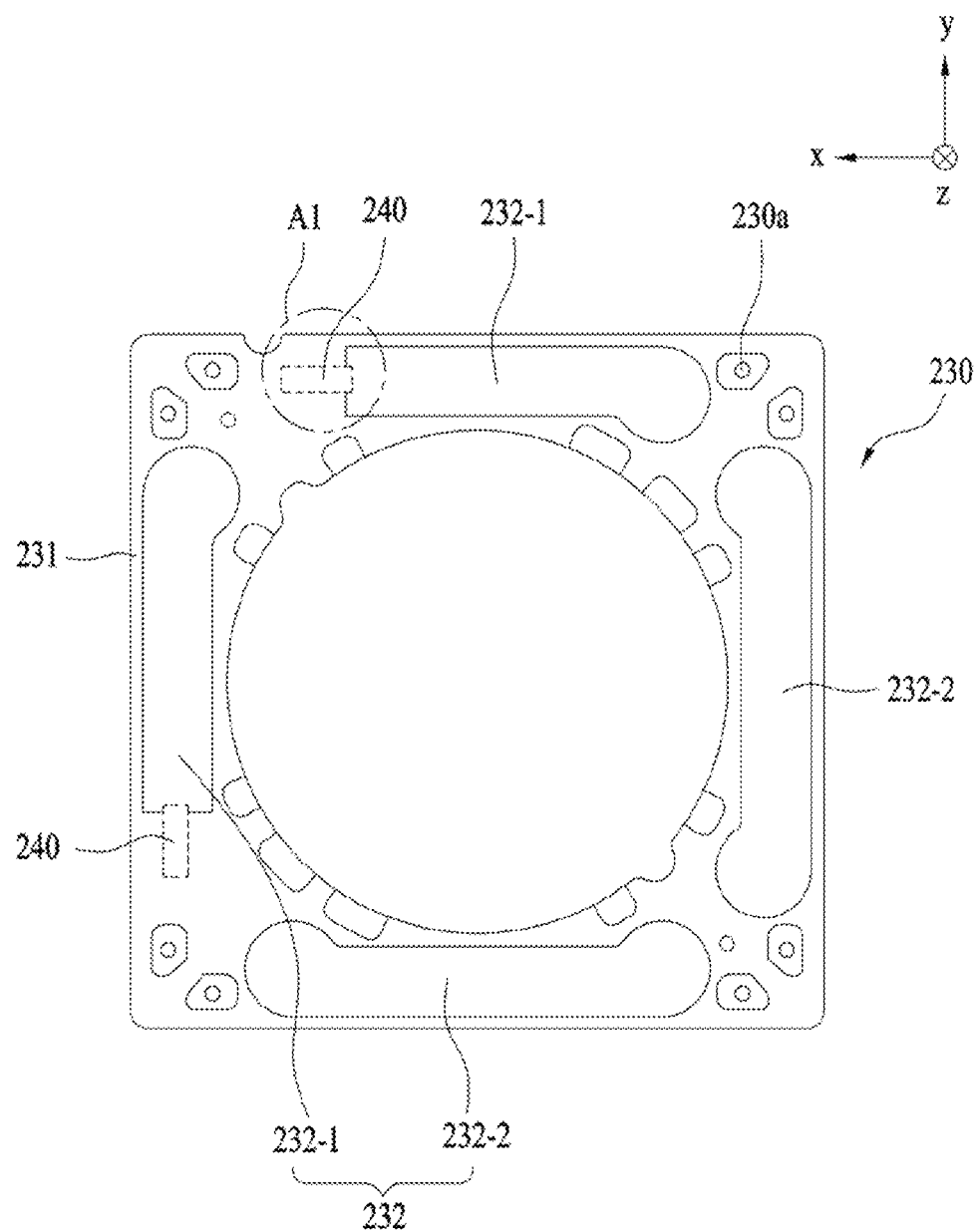
FIG. 14A is a bottom view illustrating the disposition of the second coil unit and the second sensor.
Figure 14B:
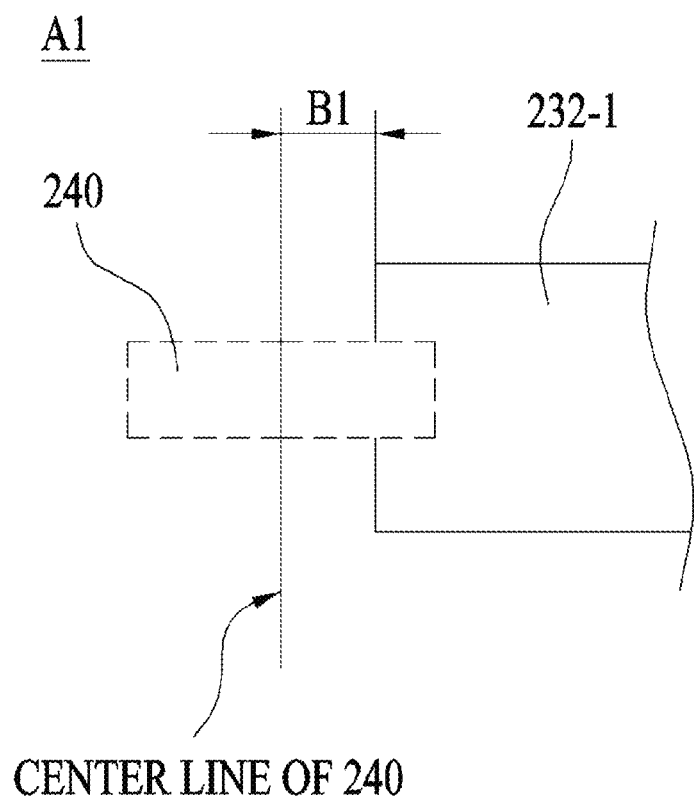
FIG. 14B is an enlarged view showing the dashed circle of FIG. 14A.

FIG. 14A is a bottom view illustrating the disposition of the second coil unit 230 and the second sensor 240. FIG. 14B is an enlarged view showing the dashed circle of FIG. 14A.

As shown in FIG. 14A, the second coil unit 230 may be configured to have a square plate, or may be constituted by a finely patterned coil. Second coils 232 of the second coil unit 230 may be positioned near respective sides of the second coil unit 230 such that the length direction of each second coil 232 is positioned on or parallel to the associated side of the second coil unit 230. Alternatively, four additional coils may be disposed at associated positions on the upper surface of the circuit board 250 without providing the second coil unit 230 having the square shape.

The second sensors 240 may be disposed such that the centers of the second sensors 240 do not overlap the second coils 232 when viewed in the first direction. To this end, each of the second sensors 240 may be disposed so as to be spaced apart from the center of the associated second coil 232 by a predetermined distance in the length direction of the second coil 232.

Since the dashed circle of FIG. 14A, which indicates the peripheral region of the second sensor 240, may be the housing 140 covering the center of the second sensor 240, the second sensor 240 may partially overlap the second coil 232. The center of the second sensor 240 may be the center of the detecting portion or the center of the peripheral region.

For disposition of the second sensors 240, some of the plurality of second coils 232 may be partially cut out such that the centers of the second sensors 240 do not overlap the second coils 232, and may be configured such that end portions thereof are eliminated or such that the longitudinal length thereof is shorter than the remaining second coils 231.

As shown in FIG. 14A, the second coils 232 may include third coils 232-1 and fourth coils 232-2, which have different lengths. The third coil 232-1, close to which the second sensor 240 is disposed, may be configured to be cut out at the end at which the second sensor 240 is positioned. The remaining fourth coils 232-2, close to which the second sensors 240 are not disposed, may not be cut out at the ends thereof.

Considering the structure of the second sensor 240, the second sensor 240 may sensitively detect variation of magnetic force at the center thereof. Hence, when the center of the second sensor 240 overlaps the second coils 232, variation of magnetic force generated by the magnet 130 may not be precisely detected due to the noise of the magnetic force generated by the second coil 232.

According to the embodiment, since the second sensor 240 is disposed such that the center of the second sensor 240 does not overlap the second coil 232, it is possible to avoid the effects of noise of the magnetic force generated by the second coil 232, and to thus precisely detect variation in the magnetic force generated by the magnet 130. Accordingly, there is an advantage of precisely detecting displacement of the housing with respect to the base in the second and/or third directions.

The second coil 232 may have a structure in which a wire is repeatedly wound or in which a plurality of layers of coils are repeatedly wound. Upon the application of current, the second coil 232 generates magnetic force so as to move all or a portion of the first lens moving unit, including the bobbin 110 in the second and/or third directions.

The second coil 232 may be formed on the second coil unit 230 by directly winding a wire or printing a wound coil pattern. The second coil 232 may be constituted by a plurality of second coil layers or a single second coil layer layered on the second coil unit 230 in the first direction.

The second coils 232 may be provided on one or both of the upper and lower surfaces of the second coil unit 230 when viewed in the first direction. The embodiment illustrates the case where the second coils 232 are provided on both the upper and lower surfaces of the second coil unit 230.

The second coil 232 may include rounded portions at ends thereof in the longitudinal direction, in which a plurality of coils are curved, and straight portions disposed between the rounded portions, in which the plurality of coils extend straight.

However, the third coil 232-1, which is cut out at the end thereof, may be configured at the cutout end thereof such that the straight coils positioned in the straight portion are bent at an angle of about 90° and are again bent at angle of 90°, resulting in the straight portion.

As shown in FIG. 14A, according to the embodiment, a plurality of second coils 232 may be provided, and the second sensors 240 may be disposed close to one end of at least one of the second coils 232. However, in FIG. 14A, the circuit board 250 is removed, and only the positional relationship between the second coil unit 230 and the second sensors 240 is shown for clarity of explanation.

In the specific embodiment, four second coils 232 may be provided such that one of a pair of second coils 232 faces the other of the pair of second coils 232. The third coils 232-1 and the fourth coils 232-2 may be disposed close to each other so as to detect displacement of the housing in the x and y axis directions, that is, in the second and/or third directions using the two second sensors 240.

Hereinafter, the configuration of the second sensors 240 will be described in detail.

The second sensors 240 may be provided at two adjacent second coils 232 among the two pairs of mating second coils 232. One of the two second sensors 240 serves to detect displacement of the housing with respect to the base in the second direction, and the other of the two second sensors 240 serves to detect displacement of the housing with respect to the base in the third direction.

Assuming that imaginary lines extend from the centers of the two second sensors 240 in the second and third directions, the imaginary extending lines may intersect each other. Thanks to this configuration, the two second sensors 240 may detect the displacement by which the whole or a portion of the first lens moving unit moves in the second and third directions.

As shown in FIG. 14B, in order to inhibit the second sensor 240 from being affected by magnetic force generated by the third coil 232-1 or to greatly reduce the effect of the magnetic force, the center of the second sensor 240, which is most sensitive to variation of magnetic force, has to be spaced apart from the end of the third coil 232-1 by a predetermined distance B1.

Specifically, the predetermined distance B1 may be set to be 0 mm or more, and may be preferably set to be 0.3 mm or more. Although the maximum value of the determined distance B1 is not particularly limited, it may be appropriately set in consideration of the size of the lens moving apparatus and size and configuration of the second sensors 240.

Figure 15:
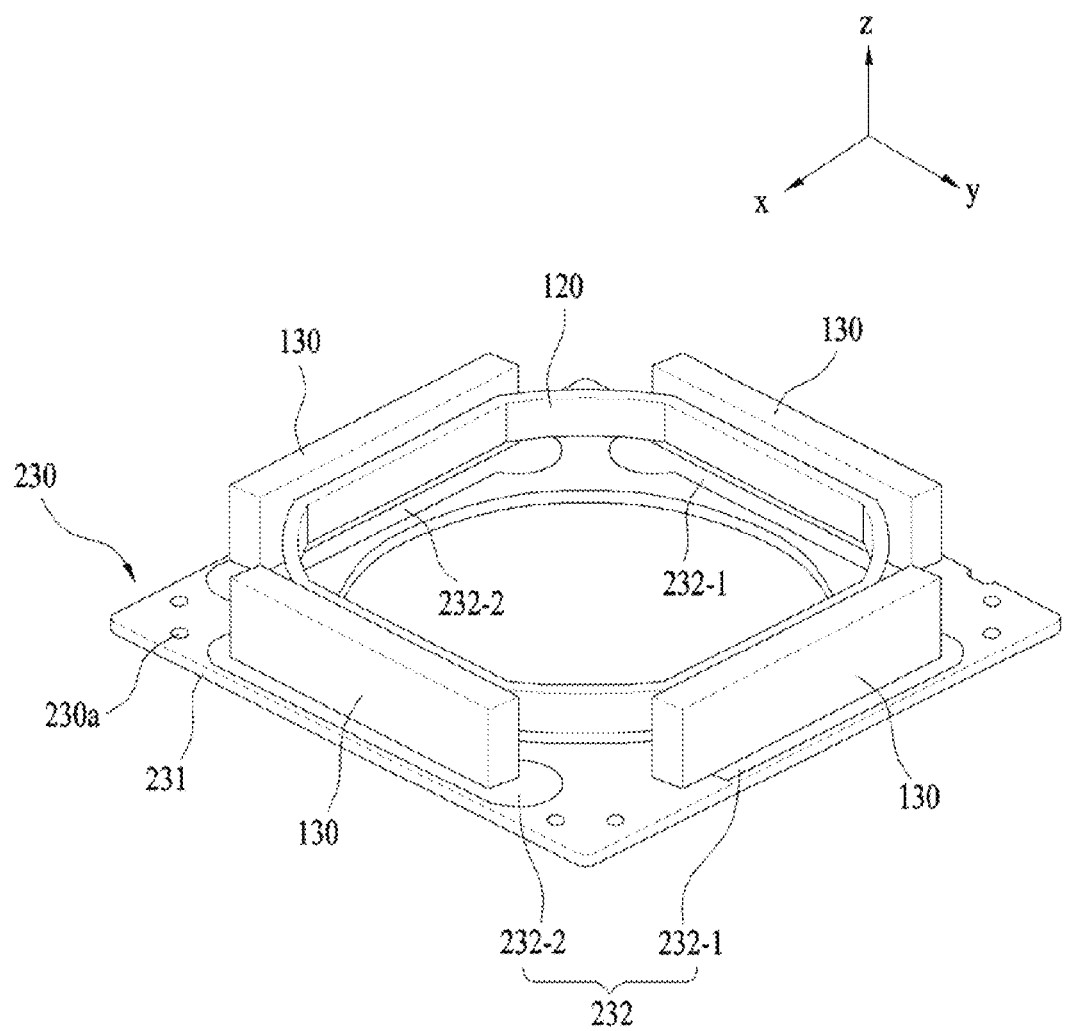
FIG. 15 is a perspective view showing the disposition of the magnets and the second coil unit according to the embodiment.
Figure 16:
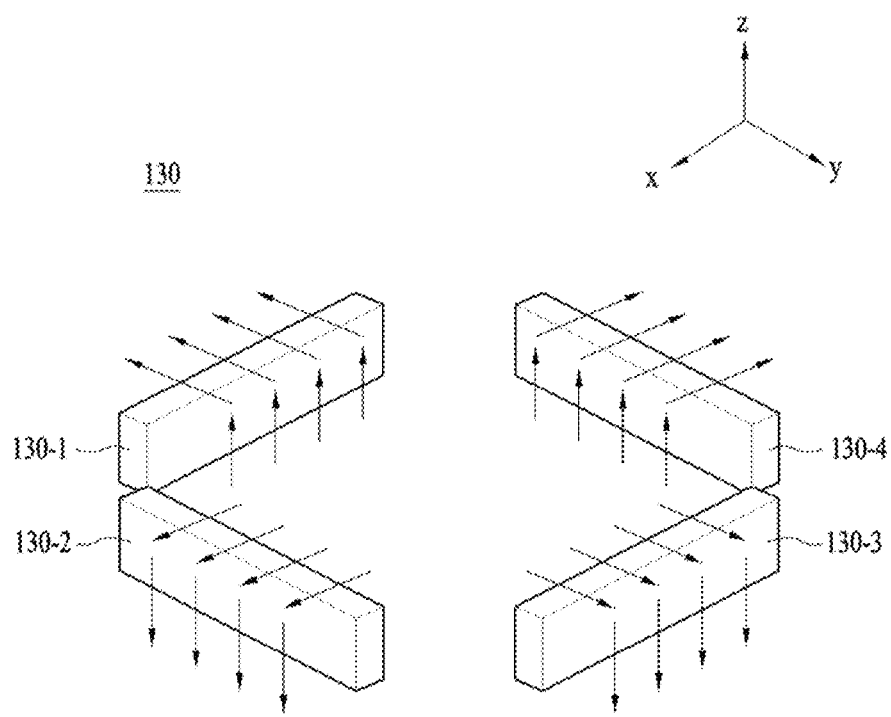
FIG. 16 is a perspective view showing the disposition of the magnets and directions of magnetic force according to the embodiment.

FIG. 15 is a perspective view showing the disposition of the magnets 130 and the second coil unit 230 according to the embodiment. FIG. 16 is a perspective view showing the disposition of the magnets 130 and the directions of magnetic force according to the embodiment.

However, FIG. 15 shows only the magnets 130 and the second coil unit 230, and omits illustration of the lower elastic member 160 and the other components, for clarity of explanation.

In the embodiment, four magnets 130 may be provided such that each of the magnets 130 is positioned close to and parallel to the associated side of the second coil unit 230. As described above, the first sensor 170 and the second sensors 240 may detect all of displacements in the first, second and third directions of the first lens moving unit by variation of magnetic force generated by the magnets 130.

In the embodiment, the fourth coil 232-2, near which the second sensor 240 is not positioned, may have a larger surface area than the magnet 130. Accordingly, the magnet 130 may be disposed to be surrounded by the fourth coil 232-2 when viewed in the first direction. The magnet 130 may be disposed between opposite rounded portions of the fourth coil 232-1.

The third coil 232-1, near which the second sensor 240 is positioned, may be configured to have a larger surface area than the magnet 130 except for the region near which the second sensor 240 is positioned. Accordingly, the magnet 130 may be disposed to be surrounded by the fourth coil 232-2 except for the region near which the second sensor 240 is positioned, when viewed in the first direction.

Magnetic force generated by the disposition the N poles 134 and the S poles 132 of the magnets 130 (130-1, 130-2, 130-3 and 130-4) may be approximately represented as illustrated in FIG. 16 in accordance with Fleming's left-hand rule.

Among the components of the magnetic force, the components related to the second and third directions are associated with the first sensor. In other words, it is possible to detect displacement in the first direction of the first lens moving unit by detecting variation of magnetic force generated by the second- and third-direction components of the magnetic force using the first sensor 170.

The first-direction component of the magnetic force is associated with the second sensor 240. In other words, it is possible to detect displacement in the second and third directions of the first lens moving unit by detecting variation of magnetic force generated by the first-direction component of the magnetic force using the second sensor 240.

Figure 17A:
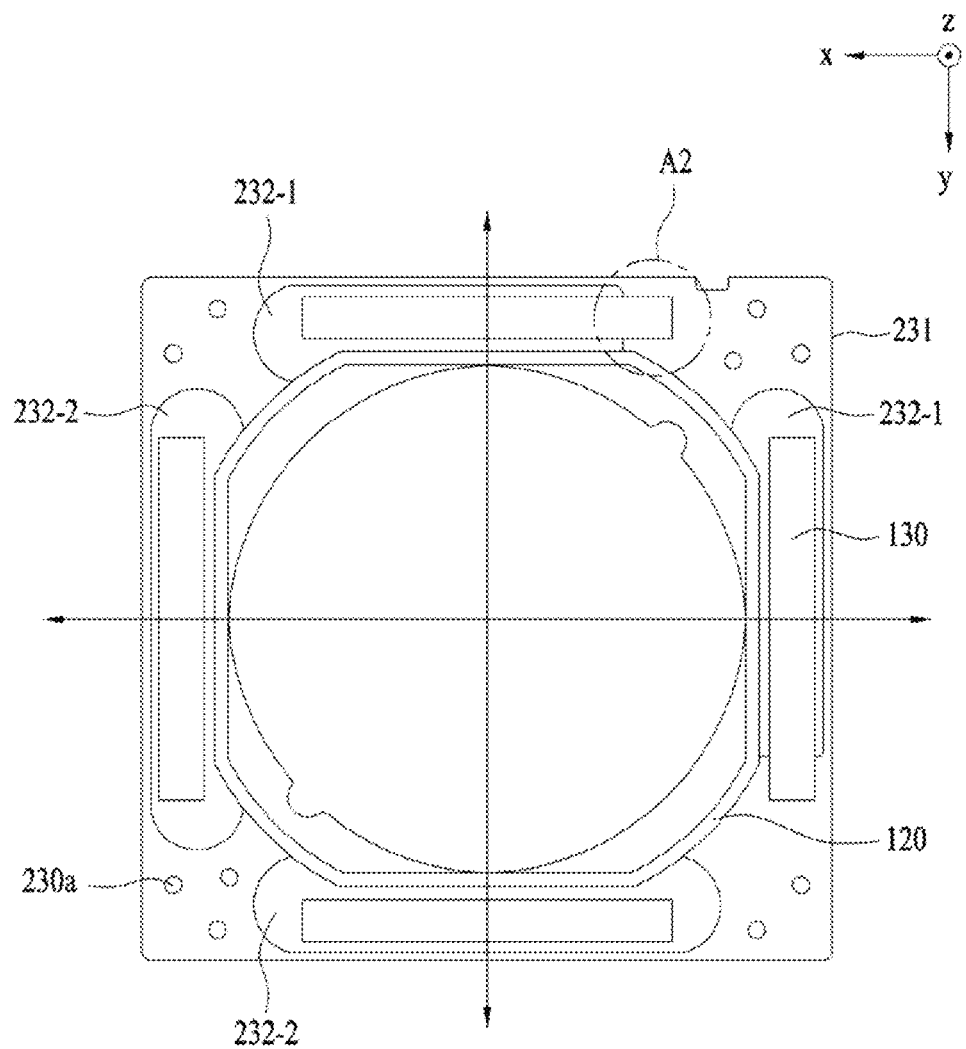
FIG. 17A is a plan view showing the disposition of the magnets and the second coil unit according to the embodiment.
Figure 17B:
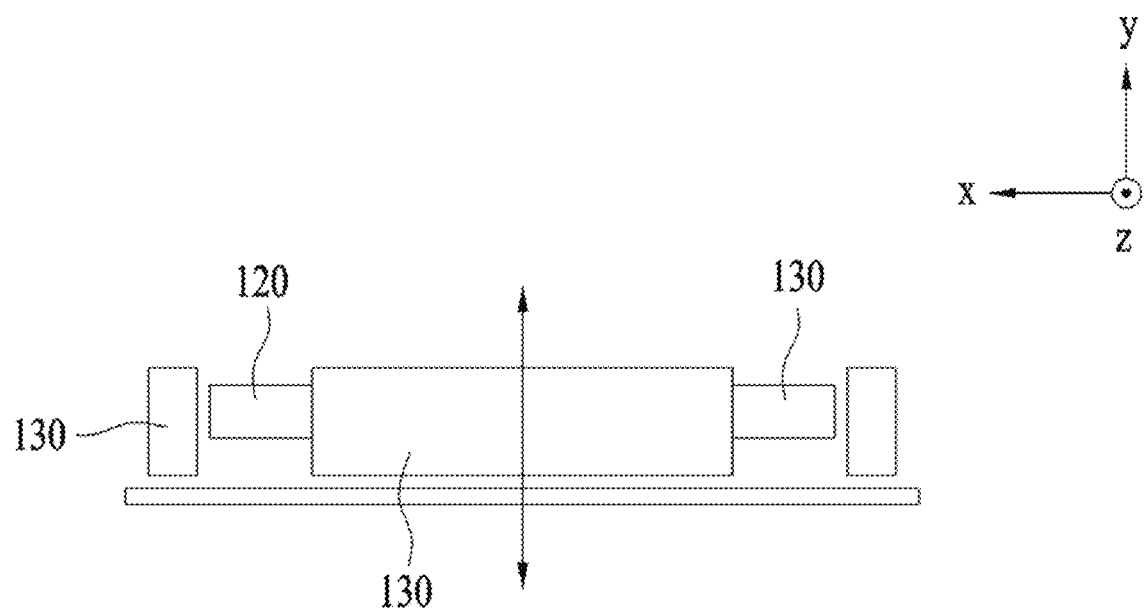
FIG. 17B is a side view showing the disposition of the magnets and the second coil unit according to the embodiment.
Figure 18:
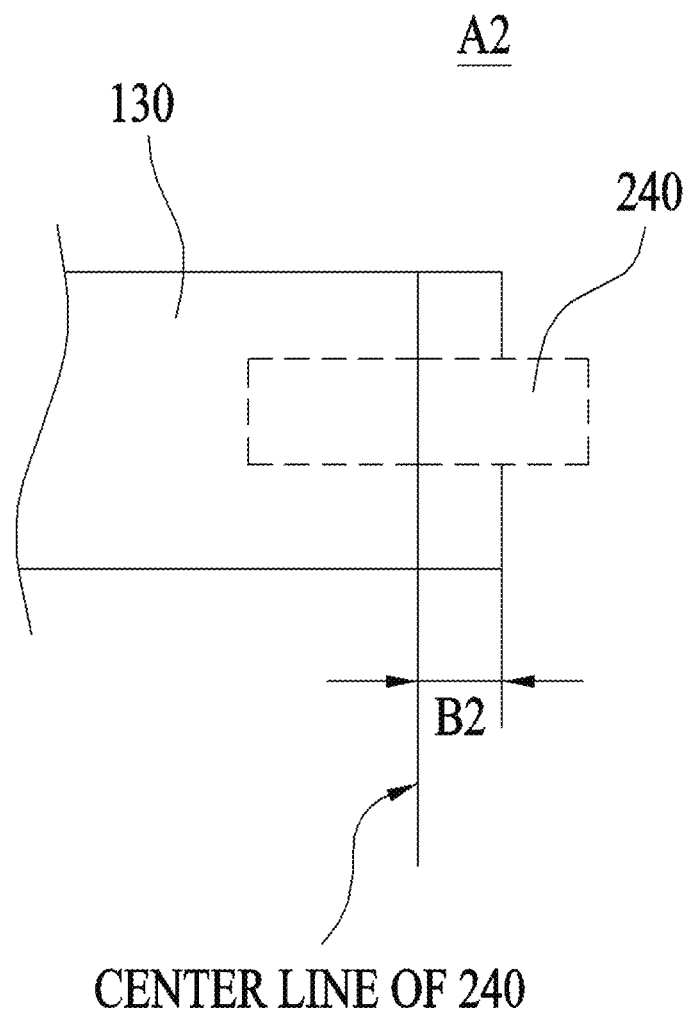
FIG. 18 is an enlarged view of a portion of FIG. 17A.

FIG. 17A is a plan view showing the disposition of the magnets 130 and the second coil unit 230 according to the embodiment. FIG. 17B is a side view showing the disposition of the magnets 130 and the second coil unit 230 according to the embodiment. FIG. 18 is an enlarged view of a portion of FIG. 17A.

As shown in FIG. 17A, the driving in the second and third directions of the first lens moving unit including the first coil, which is indicated by the arrows, may be controlled by the second lens moving unit including the second coil unit 230, which is operated by the magnetic force generated by the application of current to the second coil unit 230.

At this point, the two sensors 240 may detect displacement in the second and/or third directions of the first lens moving unit by detecting variation in the magnetic force of the magnet 130.

As shown in FIG. 17B, the driving in the first direction of the first lens moving unit including the first coil, which is indicated by the arrow, may be controlled by magnetic force generated by the application of current to the first coil and by the magnetic force generated by the magnets 130.

As described above, the first sensor 170 provided at the sensor substrate 180 may detect displacement in the first direction of the first lens moving unit by detecting variation in the magnetic force of the magnets 130.

FIG. 18 is a view illustrating the relative disposition of the magnet 130 and the second sensor 240. The second sensor 240 may be disposed such that the center of the second sensor 240 is not positioned outside the end of the magnet 130 but is positioned inside the magnet 130.

As described, since the second sensor 240 is able to sensitively detect electromagnetic force at the center thereof, the center of the second sensor 240 is preferably positioned inside the magnet 130 so as not to escape from the end of the magnet 130 when viewed in the first direction.

Accordingly, the distance B2 between the center of the second sensor 240 and the end of the magnet 130 may be set to be zero or more, and may be appropriately selected in consideration of the detection sensitivity of the second sensor 240, the overall structure of the lens moving apparatus and the like.

Figure 19:
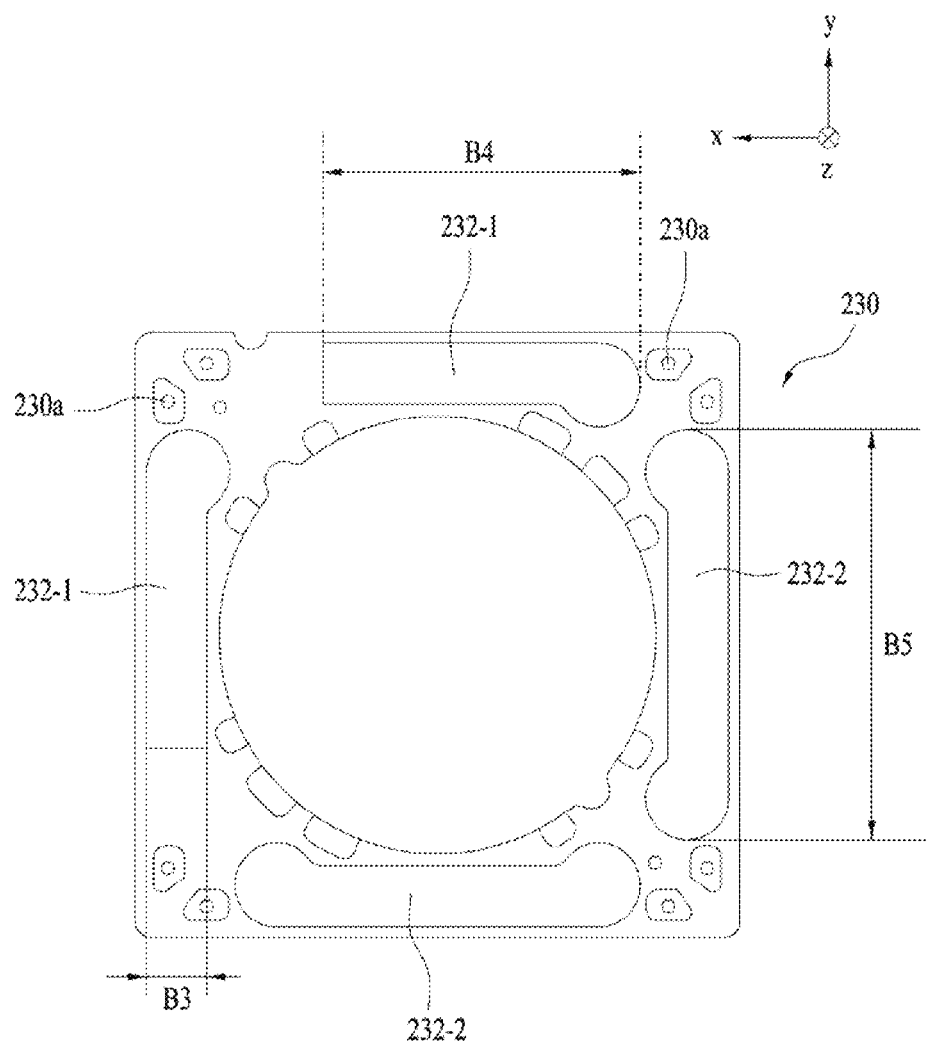
FIG. 19 is a bottom view of the second coil unit.

FIG. 19 is a bottom view of the second coil unit 230. The width B3 of the second coil 232, which is measured in the second or third direction, may be designed to be equal to or larger than the length of the shorter side of the magnet 130.

The length of the shorter side of the magnet 130 may be the length in the second or third direction. The width B3 of the second coil 232, which is measured in the second or third direction, is preferably designed such that the magnet 130 overlaps the second coil 232 when the moving distance in the second or third direction of the housing 140 is considered, that is, when the housing 140 is moved to the full extent in the second or third direction. Here, the width B3 of the second coil 232 may mean the width of the straight portion, excluding the rounded portion.

However, the width may be limited due to the overall structural restriction of the lens moving apparatus. Accordingly, the width B3 of the second coil 232 may be set to be within a range of 1 time to 2 times, or 1.2 times to 2 times the length of the shorter side of the first magnet 130.

In the case of the second coil 232, particularly, in the case of the third coil 232-1 near which the second sensor 240 is positioned, the length B4 of the third coils 231-1 may be equal to or shorter than the length of the first magnet 130. Alternatively, one end of the first magnet 130 may extend beyond one end of the third coils 232-1.

In order to inhibit the second sensor 240 from being affected by magnetic force generated from the second coil unit 230 due to overlapping of the center of the second sensor 240 and the second coil unit 230 as described above, the length B4 of the fourth coil 232-2, near which the second sensor 240 is positioned, is preferably set to be within a range of 0.7 multiples to 1 multiple of the length of the magnet 130.

In the case of the fourth coil 232-2 near which the second sensor 240 is not positioned, the length B5 of the fourth coil 232-2 may be set to be equal to or longer than the length of the magnet 130.

Considering the intensity of magnetic force generated by the magnet 130, the overall structure of the lens moving unit, and the like, the length B5 of the fourth coil 232-2 is preferably set to be within a range of 1 time to 1.5 times the length of the magnet 130.

Figure 20A:
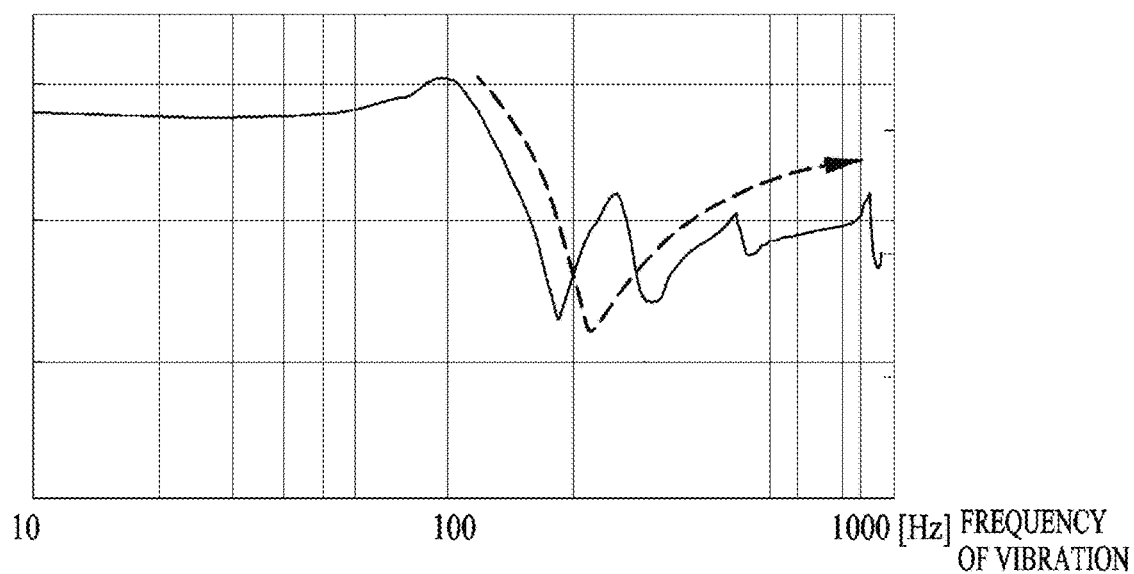
FIGS. 20A and 20B are graphs showing the result of frequency response analysis of the support members.
Figure 20B:
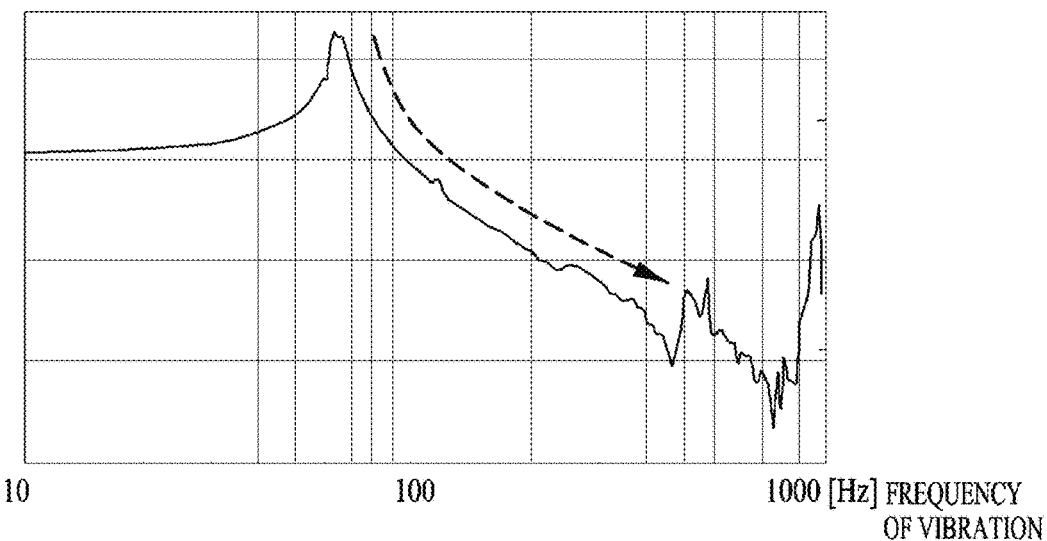

FIGS. 20A and 20B are graphs showing the result of frequency response analysis of the support members 220.

For execution of the frequency response analysis, the support members 220 have to be vibrated. To this end, an electrical pulse having a frequency of 10 Hz to 100 Hz is applied to the second coil unit 230. Consequently, the support members 220 vibrate by the magnetic force generated by the second coil unit 230. The vibration characteristics of the support members 220 are detected by the second sensor 240, and the result of the detection is represented as amplitude of vibration in the graphs. At this point, variation in the amplitude of vibration can be found by frequency of vibration obtained by measuring the ratio of the current output from the second sensor 240 to the current input to the second coil unit 230, that is, the gain.

FIG. 20A is a graph showing the result of frequency response analysis in the case where the second sensor 240 is positioned at the center of the second coil 232, that is, the center of the second sensor 240 overlaps the second coil 232. FIG. 20B is a graph showing result of frequency response analysis in the case where the center of the second sensor 240 does not overlap the second coil 232.

As shown in FIG. 20A, the center of the second sensor 240 overlaps the second coil 232, amplitude of vibration drops and then rises again in a frequency range of about 400-800 Hz, as indicated by the dashed arrow.

Since the variation caused by frequency of vibration can be easily anticipated when such unstable frequency characteristics occur, the second sensor 240 cannot accurately detect the displacement of the support members 220 even if the second sensor 240 and the apparatus for controlling the second sensor 240 are calibrated. The vibration characteristics are attributable to the fact that the second sensor 240 is affected by the magnetic force generated by the second coil unit 230, and thus generates noise.

As shown in FIG. 20B, when the center of the second sensor 240 does not overlap the second coil 232, it was found that the amplitude of vibration stably decreases in a frequency range of 400-800 Hz, as indicated by the dashed arrow.

When such stable vibration characteristics are represented, it is possible to easily anticipate the variation caused by frequency of vibration. Accordingly, the second sensor 240 can very precisely detect displacement of the support members 220 as long as the sensor 240 and the apparatus for controlling the sensor 240 are calibrated.

In the embodiment, since displacement of the support members 220 is precisely detected by disposing the center of the second sensor 240 so as not to overlap the second coil 232, the inherent frequency of vibration of the support members 220 can be easily controlled upon controlling the second sensor 240, whereby the resonance phenomenon, which would otherwise occur due to the vibrations, can be avoided or easily addressed.

Figure 21:
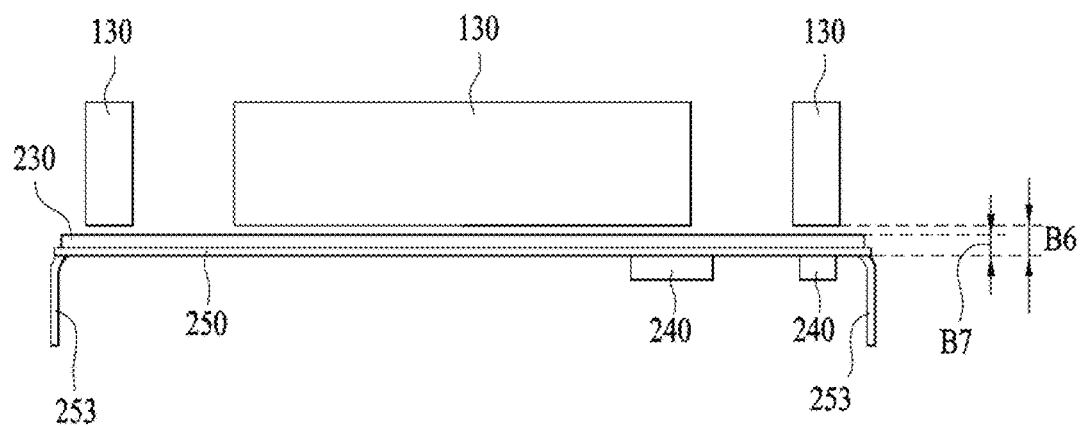
FIG. 21 is a view showing the positional relationship of the magnet, the second sensor and the second coil unit.

FIG. 21 is a view showing the positional relationship of the magnet 130, the second sensor 240 and the second coil unit 230. Specifically, FIG. 21 illustrates an example of the distance between the magnet 130 and the second sensor 240 and the distance between the magnet 130 and the second coil unit 230.

The distance between the upper surface of the second sensor 240 and the lower surface of the magnet 130, which is measured in the first direction, may be set to be within a range of 0.1 mm to 1 mm, preferably 0.2 mm to 0.8 mm, and more preferably 0.3 mm to 0.6 mm in consideration of the overall structure of the lens moving apparatus, the performance of the second sensor 240 by which magnetic force or the like are detected.

The distance B7 between the upper surface of the second sensor 240 and the upper surface of the second coil unit 230, which is measured in the first direction, may be set to be within a range of 0.05 mm to 0.9 mm, preferably 0.15 mm to 0.7 mm, and more preferably 0.25 mm to 0.5 mm in consideration of the overall structure of the lens moving apparatus, the magnetic force detection performance of the second sensor 240, and the like.

The lens moving apparatus according to this embodiment may be incorporated in devices in various fields, for example, a camera module. A camera module may be applied to mobile devices such as cellular phones.

The camera module according to this embodiment may include the lens barrel coupled to the bobbin 110, an image sensor (not shown), a printed circuit board 250, and an optical system.

The lens barrel may be constructed as described above, and the circuit board 250 may constitute the bottom surface of the camera module, starting from the area on which the image sensor is mounted.

The optical system may include at least one lens for transmitting images to the image sensor. The optical system may be provided with an actuator module capable of fulfilling autofocusing and optical image stabilizing functions. The actuator module for fulfilling the autofocusing function may be constructed in various fashions, and mainly adopts a voice coil unit motor. The lens moving apparatus according to this embodiment may serve as an actuator module for fulfilling both autofocusing and optical image stabilizing functions.

The camera module may further include an infrared ray screening filter (not shown). The infrared ray screening filter serves to shield the image sensor against light in the infrared range. In this case, the base 210, which is illustrated in FIG. 2, may be provided with the infrared ray screening filter at a position corresponding to the image sensor, and the infrared ray screening filter may be coupled to the base 210 by means of a holder member (not shown). Furthermore, the base 210 may support the lower portion of the holder member.

The base 210 may be provided with an additional terminal member for connection with the circuit board 250, and the terminal member may be integrally formed using a surface electrode. The base 210 may serve as a sensor holder for protecting the image sensor. In this case, although the base 210 may be provided along the lateral side surface thereof with protrusions projecting downward, these are not essential components. Although not shown in the drawings, an additional sensor holder disposed under the base 210 may fulfill the function of the protrusions.

Thanks to the above-described construction, the operations of the autofocusing and handshake correction of the first and second lens moving units may be realized by sharing the magnet 130. In the lens moving apparatus according to the embodiments, the first sensor 170 may be disposed, coupled or mounted on the housing 140 or the bobbin 110, and the autofocusing magnet 130 may be shared as the detecting magnet, or the detecting magnet may be additionally disposed. If the autofocusing magnet 130 is shared as the detecting magnet, or the detecting magnet is positioned so as not to interact with the autofocusing magnet 130, the detecting magnet does not affect the autofocusing magnet 130. Consequently, tilting of the bobbin 110 does not occur, and the accuracy of the feedback signal is improved. Furthermore, the number of components is not increased, and the weight of the housing 140 is reduced, thus improving responsiveness. Of course, the autofocusing magnet and the handshake correction magnet may be independently constructed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lens moving apparatus comprising:
a base;
a circuit board disposed on the base;
a circuit member disposed on the circuit board
a bobbin disposed on the base;
a first coil disposed on the bobbin;
a first magnet facing the first coil;
a second coil facing the first magnet;
an elastic member coupled to the bobbin;
a support member connecting the elastic member and at least one of the circuit board and the circuit member; and
a second sensor disposed on a lower surface of the circuit board,
wherein the second coil is disposed on the circuit member,
wherein the second coil comprises a first coil part, a second coil part disposed opposite to the first coil part, a third coil part, and a fourth coil part disposed opposite to the third coil part;
wherein the first magnet comprises a first magnet part facing the first coil part in an optical axis direction, a second magnet part facing the second coil part in the optical axis direction, a third magnet part facing the third coil part in the optical axis direction, and a fourth magnet part facing the fourth coil part in the optical axis direction;
wherein the second sensor comprises a first sensor part and a second sensor part,
wherein one end portion of the first magnet part is not overlapped with the first coil part and overlapped with the first sensor part in the optical axis direction,
wherein the other end portion of the first magnet part is overlapped with the first coil part in the optical axis direction, and
wherein both ends of the second magnet part are overlapped with the second coil part in the optical axis direction.

2. The lens moving apparatus according to claim 1, wherein the first sensor part is adjacent to an end of the fourth coil part, and the second sensor part is closer to an end of the first coil part than to the second coil part.

3. The lens moving apparatus according to claim 1, wherein a length of the second coil part is smaller than a length of the second magnet part.

4. The lens moving apparatus according to claim 1, wherein a length of the first coil part is equal to or less than a length of the first magnet.

5. The lens moving apparatus according to claim 1, wherein the circuit member comprises a hole formed at a corner portion of the circuit member adjacent to the first sensor part, and
the support member is connected to the hole of the circuit member.

6. The lens moving apparatus according to claim 1, wherein a length of the first coil part is smaller than a length of the second coil part.

7. The lens moving apparatus according to claim 6, wherein a lower surface of the third magnet part comprises one end portion of the third magnet part not overlapped with the third coil part in the optical axis direction, and
wherein the second sensor part is overlapped with the one end portion of the lower surface of the third magnet part in the optical axis direction.

8. The lens moving apparatus according to claim 7, wherein a length of the third coil part is smaller than a length of the fourth coil part.

9. The lens moving apparatus according to claim 8, wherein the first sensor part is configured to detect displacement of the housing with respect to the base in a X-axis direction, and the second sensor part is configured to detect displacement of the housing with respect to the base in a Y-axis direction.

10. The lens moving apparatus according to claim 7, wherein the other end portion of the lower surface of the first magnet part is overlapped with the first coil part in the optical axis direction, and
wherein the other end portion of the lower surface of the third magnet part is overlapped with the third coil part in the optical axis direction.

11. The lens moving apparatus according to claim 10, wherein the one end portion of the first magnet part is disposed outside the first coil part when viewed from the top, and the other end of the first magnet part is disposed within both ends of the first coil part.

12. The lens moving apparatus according to claim 11, wherein both ends of the second magnet part are disposed within both ends of the second coil part when viewed from a top view.

13. The lens moving apparatus according to claim 11, wherein the one end of the third magnet part is disposed outside the third coil part when viewed from the top, and the other end of the third magnet part is disposed within both ends of the third coil part, and
wherein both ends of the fourth magnet part are disposed within both ends of the fourth coil part when viewed from a top view.

14. The lens moving apparatus according to claim 1, further comprising a first sensor for detecting displacement of the bobbin,
wherein the elastic member comprises an upper elastic member coupled to an upper surface of the housing and a lower elastic member coupled to a lower surface of the housing;
wherein the upper elastic member comprises first to fourth upper elastic members,
wherein the support member comprises first to fourth support members, and
wherein the first sensor is connected to the first to fourth support members via the first to fourth upper elastic members, respectively.

15. The lens moving apparatus according to claim 14, wherein the lower elastic member comprises first and second lower elastic members, which are separated from each other, and
wherein the first coil is connected to the first and second lower elastic members.

16. The lens moving apparatus according to claim 14, wherein the upper elastic member further comprises a fifth upper elastic member and a sixth upper elastic member, which are separated from each other,
wherein each of the fifth upper elastic member and the sixth upper elastic member is coupled to the housing and electrically connected to the first coil.

17. The lens moving apparatus according to claim 14, further comprising a second magnet disposed to face the first sensor.

18. The lens moving apparatus according to claim 14, further comprising a sensor substrate coupled to the bobbin,
wherein the first sensor is coupled to the sensor substrate, and
wherein the sensor substrate is disposed on the bobbin.

19. A lens moving apparatus comprising:
a base;
a substrate disposed on the base;
a bobbin disposed on the base;
a first coil disposed on the bobbin;
a first magnet facing the first coil;
a second coil facing the first magnet;
an elastic member coupled to the bobbin;
a wire connecting the elastic member and the substrate; and
a second sensor disposed on the substrate,
wherein the second coil and the second sensor are disposed on opposite sides of the substrate,
wherein the second coil comprises a first coil part, a second coil part disposed opposite to the first coil part, a third coil part, and a fourth coil part disposed opposite to the third coil part;
wherein the first magnet comprises a first magnet part facing the first coil part in an optical axis direction, a second magnet part facing the second coil part in the optical axis direction, a third magnet part facing the third coil part in the optical axis direction, and a fourth magnet part facing the fourth coil part in the optical axis direction;
wherein the second sensor comprises a first sensor part and a second sensor part,
wherein one end portion of the first magnet part is overlapped with the first sensor part in the optical axis direction, and the other end portion of the first magnet part is overlapped with one end of the first coil part in the optical axis direction, and
wherein both ends of the second magnet part are overlapped with the second coil part in the optical axis direction.

20. The lens moving apparatus according to claim 19, wherein the substrate comprises a hole formed at a corner portion of the substrate adjacent to the first sensor part, and
wherein the wire is inserted in the hole of the substrate.

21. The lens moving apparatus according to claim 19, wherein at least a portion of the first sensor part is disposed outside of the other end of the first coil part when viewed from a top view.

22. The lens moving apparatus according to claim 19, wherein the first to fourth coil parts are disposed on an upper surface of the substrate, and
the first sensor part and a second sensor part are disposed on a lower surface of the substrate.

23. The lens moving apparatus according to claim 19, wherein the base comprises a recess, and the second sensor is disposed in the recess of the base.

24. A lens moving apparatus comprising:
a housing;
a bobbin disposed in the housing;
a first coil disposed on the bobbin;
a first magnet disposed on the housing and facing the first coil;
an elastic member coupled to the bobbin and the housing;
a circuit member disposed below the housing and comprising a second coil facing the first magnet;
a circuit board disposed below the circuit member and comprising a terminal;
a base disposed below the circuit board;
a support member connecting the elastic member and any one of the circuit board and the circuit member; and
a second sensor disposed on a lower surface of the circuit board,
wherein the second coil is formed at the circuit member,
wherein the second coil comprises a first coil part, a second coil part disposed opposite to the first coil part, a third coil part, and a fourth coil part disposed opposite to the third coil part;
wherein the first magnet comprises a first magnet part facing the first coil part in an optical axis direction, a second magnet part facing the second coil part in the optical axis direction, a third magnet part facing the third coil part in the optical axis direction, and a fourth magnet part facing the fourth coil part in the optical axis direction;
wherein the second sensor comprises a first sensor part and a second sensor part,
wherein a lower surface of the first magnet part comprises a first region overlapped with the first coil part in the optical axis direction and a second region not overlapped with the first coil part in the optical axis direction, and the second region of the lower surface of the first magnet part is one end portion of the lower surface of the first magnet part, and
wherein the first sensor part is overlapped with the second region of the lower surface of the first magnet part in the optical axis direction.

25. The lens moving apparatus according to claim 24,
wherein a lower surface of the third magnet part comprises a first region overlapped with the third coil part in the optical axis direction, and a second region not overlapped with the third coil part in the optical axis direction,
wherein the second sensor part is overlapped with the second region of the lower surface of the third magnet part in the optical axis direction.

26. The lens moving apparatus according to claim 24, wherein a center of the first sensor part is overlapped with the second region of the first magnet part, and the center of the first sensor part is a detecting portion of the first sensor part.

27. The lens moving apparatus according to claim 26, wherein a center of the second sensor part is overlapped with the second region of the third magnet part, and the center of the second sensor part is a detecting portion of the second sensor part.

28. A camera module comprising:
the lens moving apparatus according to claim 1;
a lens barrel coupled to the bobbin of the lens moving apparatus; and
an image sensor.

* * * * *